(12) United States Patent
Nakano et al.

(10) Patent No.: US 7,657,739 B2
(45) Date of Patent: Feb. 2, 2010

(54) AUTHENTICATION SYSTEM

(75) Inventors: Toshihisa Nakano, Osaka (JP); Makoto Tatebayashi, Hyogo (JP); Hideshi Ishihara, Osaka (JP)

(73) Assignee: Panasonic Corporation, Osaka (JP)

( * ) Notice: Subject to any disclaimer, the term of this patent is extended or adjusted under 35 U.S.C. 154(b) by 433 days.

(21) Appl. No.: 10/578,831

(22) PCT Filed: Nov. 24, 2004

(86) PCT No.: PCT/JP2004/017415

§ 371 (c)(1),
(2), (4) Date: May 10, 2006

(87) PCT Pub. No.: WO2005/052802

PCT Pub. Date: Jun. 9, 2005

(65) Prior Publication Data

US 2007/0083757 A1    Apr. 12, 2007

(30) Foreign Application Priority Data

Nov. 25, 2003  (JP)  ............................. 2003-394709

(51) Int. Cl.
*G06F 7/04*  (2006.01)
(52) U.S. Cl. ............................. 713/158; 726/29; 726/30
(58) Field of Classification Search ........................ None
See application file for complete search history.

(56) References Cited

U.S. PATENT DOCUMENTS

| | | | |
|---|---|---|---|
| 5,949,877 A | | 9/1999 | Traw et al. |
| 6,092,201 A | * | 7/2000 | Turnbull et al. ................. 726/4 |
| 7,225,164 B1 | * | 5/2007 | Candelore et al. ............. 705/57 |
| 2002/0120847 A1 | | 8/2002 | Kamperman |
| 2002/0184259 A1 | | 12/2002 | Akishita et al. |
| 2003/0046238 A1 | * | 3/2003 | Nonaka et al. ................. 705/51 |
| 2003/0050970 A1 | * | 3/2003 | Akiyama ..................... 709/203 |
| 2003/0084306 A1 | * | 5/2003 | Abburi et al. ............... 713/188 |
| 2008/0072040 A1 | * | 3/2008 | Asano et al. ................. 713/158 |

FOREIGN PATENT DOCUMENTS

| | | |
|---|---|---|
| EP | 0 930 556 A2 | 7/1999 |
| EP | 1 414 183 A1 | 4/2004 |
| JP | 11-205305 | 7/1999 |
| JP | 2001-197054 | 7/2001 |
| JP | 2002-023627 | 1/2002 |
| JP | 2002-135243 | 5/2002 |
| JP | 2003-115838 | 4/2003 |
| JP | 2004-201008 | 7/2004 |
| WO | 2005/003886 A2 | 1/2005 |

* cited by examiner

*Primary Examiner*—Emmanuel L Moise
*Assistant Examiner*—David J Pearson
(74) *Attorney, Agent, or Firm*—Wenderoth, Lind & Ponack, L.L.P.

(57) ABSTRACT

A device that ensures that one device acquires and updates a list used for judging whether the other device in communication is valid or invalid, in a device authentication system. When a list H stored in a personal computer 200 is old, the personal computer 200 acquires a latest version of the list H and a latest version of a list D from outside an internal network, updates the list H stored therein to the latest version, and updates the list D stored therein to the latest version.

16 Claims, 14 Drawing Sheets

FIG.4

LIST H 500

| | | |
|---|---|---|
| VERSION NUMBER : HVN | 0003 — 501a | 501 |
| PAIR COUNT | 0004 — 502a | 502 |
| FIRST UNREVOKED CERTIFICATE IDENTIFIER:HID$_1$ | 0002 — 503a | 503 |
| LAST UNREVOKED CERTIFICATE IDENTIFIER:HID$_2$ | 0004 — 503b | |
| FIRST UNREVOKED CERTIFICATE IDENTIFIER:HID$_3$ | 0006 — 504a | 504 |
| LAST UNREVOKED CERTIFICATE IDENTIFIER:HID$_4$ | 0008 — 504b | |
| FIRST UNREVOKED CERTIFICATE IDENTIFIER:HID$_5$ | 0010 — 505a | 505 |
| LAST UNREVOKED CERTIFICATE IDENTIFIER:HID$_6$ | 0012 — 505b | |
| FIRST UNREVOKED CERTIFICATE IDENTIFIER:HID$_7$ | 0017 — 506a | 506 |
| LAST UNREVOKED CERTIFICATE IDENTIFIER:HID$_8$ | 9999 — 506b | |
| CA SIGNATURE DATA | Sig(SK_CA,HVN ‖ HID$_1$ ‖ HID$_2$) | 507 |
| CA SIGNATURE DATA | Sig(SK_CA,HVN ‖ HID$_3$ ‖ HID$_4$) | 508 |
| CA SIGNATURE DATA | Sig(SK_CA,HVN ‖ HID$_5$ ‖ HID$_6$) | 509 |
| CA SIGNATURE DATA | Sig(SK_CA,HVN ‖ HID$_7$ ‖ HID$_8$) | 510 |

CERTIFICATE IDENTIFIER LIST 700

| Field | Value | |
|---|---|---|
| VERSION NUMBER : VN | 0003 | ~701 |
| TYPE FLAG | 00 | ~741 |
| GROUP INFORMATION | 0001:0008 | ~702 |
| IDENTIFIER COUNT | 0002 | ~703 |
| REVOKED CERTIFICATE IDENTIFIER:$ID_1$ | 0001 | ~704 |
| REVOKED CERTIFICATE IDENTIFIER:$ID_2$ | 0004 | ~705 |
| TYPE FLAG | 10 | ~742 |
| GROUP INFORMATION | 0009:0016 | ~706 |
| IDENTIFIER COUNT | 0002 | ~707 |
| UNREVOKED CERTIFICATE IDENTIFIER:$ID_3$ | 0012 | ~708 |
| UNREVOKED CERTIFICATE IDENTIFIER:$ID_4$ | 0016 | ~709 |
| TYPE FLAG | 11 | ~743 |
| GROUP INFORMATION | 0017:9999 | ~710 |
| PAIR COUNT | 0001 | ~711 |
| FIRST UNREVOKED CERTIFICATE IDENTIFIER:$ID_5$ | 0018 | ~712a |
| LAST UNREVOKED CERTIFICATE IDENTIFIER:$ID_6$ | 9999 | ~712b |
| CA SIGNATURE DATA $Sig_1$ | Sig(SK_CA,Flag ∥ 0001 ∥ 0008 ∥ VN ∥ $ID_1$ ∥ $ID_2$) | ~713 |
| CA SIGNATURE DATA $Sig_2$ | Sig(SK_CA,Flag ∥ 0009 ∥ 0016 ∥ VN ∥ $ID_3$ ∥ $ID_4$) | ~714 |
| CA SIGNATURE DATA $Sig_3$ | Sig(SK_CA,Flag ∥ 9999 ∥ 0017 ∥ VN ∥ $ID_5$ ∥ $ID_6$) | ~715 |

CERTIFICATE IDENTIFIER LIST 800

| | | |
|---|---|---|
| VERSION NUMBER : VN | 0003 | |
| IDENTIFIER COUNT | 0006 | |
| TYPE FLAG | REVOKED CERTIFICATE IDENTIFIER:ID$_1$ | 0001 |
| TYPE FLAG | REVOKED CERTIFICATE IDENTIFIER:ID$_2$ | 0004 |
| TYPE FLAG | REVOKED CERTIFICATE IDENTIFIER:ID$_3$ | 0009 |
| TYPE FLAG | REVOKED CERTIFICATE IDENTIFIER:ID$_4$ | 0013 |
| TYPE FLAG | REVOKED CERTIFICATE IDENTIFIER:ID$_5$ | 0015 |
| TYPE FLAG | REVOKED CERTIFICATE IDENTIFIER:ID$_6$ | 0017 |
| CA SIGNATURE DATA | Sig1(SK_CA,Flag ‖ 0001 ‖ 0008 ‖ VN ‖ ID$_1$ ‖ ID$_2$) | |
| CA SIGNATURE DATA | Sig2(SK_CA,Flag ‖ 0009 ‖ 0016 ‖ VN ‖ ID$_3$ ‖ ID$_4$) | |
| CA SIGNATURE DATA | Sig3(SK_CA,Flag ‖ 0017 ‖ 9999 ‖ VN ‖ ID$_5$ ‖ ID$_6$) | |

820: X,2,3,X,5,6,7,8,X,10,11,12,X,14,X,16,X,18,...

AUTHENTICATION SYSTEM

BACKGROUND OF THE INVENTION

1. Field of the Invention

The present invention relates to techniques of authenticating another party in a communication.

2. Description of the Related Art

Due to the rapid spread of Internet use, systems which perform communications based on the Internet are on the increase in recent years. One example of such systems is electronic commerce that conducts buying and selling over the Internet.

In such an Internet-based communications system, it is necessary to make sure that the other party in communication is an authentic participant in the system. This is called authentication. The party referred to here may be a person who operates a device or a device which performs a predetermined procedure. Hereafter, the party is called a device, which is assumed to include both of the above senses. Device authentication means one device authenticates the other device in communication. The device authentication is a concept that involves both "proof" and "verification". The proof means the other device tries to prove its validity, that is, the other device tries to prove that it is an authentic participant in the system. The verification means the device verifies the validity of the other device.

Cryptography is employed for secret communications of information or the aforementioned authentication in these communications systems. There are mainly two types of cryptography: secret key cryptography and public key cryptography. In secret key cryptography, a same key is used for encryption and decryption. In public key cryptography, meanwhile, different keys are used for encryption and decryption.

It is desirable to use a public key cipher for the aforementioned authentication, for the following reason. In authentication based on a secret key cipher, namely, password authentication, a verifier possesses the same secret information as a prover. This being so, the verifier may impersonate the prover once the authentication has been performed. In authentication based on a public key cipher, on the other hand, a prover provides proof using a private key of the public key cipher, and a verifier performs verification using a public key corresponding to the private key. In the public key cipher, it is impossible to derive the private key from the public key. Therefore, the verifier cannot impersonate the prover after the authentication.

In public key cryptography, a process of generating data (signature text or signature data) to prove validity using a private key is called signature generation, and a process of verifying the validity of the signature data using a public key corresponding to the private key is called signature verification.

For instance, authentication based on a public key cipher is conducted as follows. A first device sends random number data to a second device as challenge data. The second device signs the random number data using a private key of the second device, and sends the result to the first device as response data. Lastly, the first device verifies the signature received from the second device using a public key of the second device. Typically, such public key cipher-based authentication is based on a precondition that the public key is valid in the system.

In general, an organization called a certification authority (CA) issues a "public key certificate" attesting to the validity of a public key of each device in the system, to thereby "endorse" the public key. In detail, the CA generates electronic signature data from a result of concatenating data such as an identifier of the device, an expiration date, and the public key of the device. The CA then generates a public key certificate that contains the concatenation data and the electronic signature data, and issues the generated public key certificate. A device that receives the public key certificate verifies the electronic signature data of the CA, and also checks the contents of the public key certificate based on the device identifier and a current time, to thereby confirm the validity of the public key. Also, a CRL (Certificate Revocation List) is issued to announce public key certificates which have been revoked from the system and are no longer valid. The CRL is a list of information identifying the revoked public key certificates, accompanied by electronic signature data of the CA.

Thus, one device acquires a public key certificate of the other device and checks whether the public key certificate is not listed in the CRL (i.e., has not been revoked), before performing authentication on the other device using a public key of the other device. In this way, communications with unauthorized devices can be avoided. Since CRL formats and implementations can be realized using known techniques in the art, their detailed explanation has been omitted here. As one example, the X.509 standard of ISO/IEC/ITU defines CRL formats, that is, CRL data structures.

Each time a public key certificate is revoked, the CRL is updated by adding an identifier of the revoked public key certificate, and the new CRL is delivered to each device.

BRIEF SUMMARY OF THE INVENTION

However, even if the new CRL is delivered to each device, there is no guarantee that each device updates the old CRL held therein using the new CRL. This is because the device gains no direct benefit from updating the CRL. For example, by using the old CRL, the device can communicate with another device whose public key certificate has newly been revoked according to the new CRL. This lack of benefit of updating the CRL results in the difficulty of preventing the use of unauthorized devices.

The present invention was conceived to solve the above problem, and aims to provide an authentication system, a judgment device, a judgment method, and a computer program that ensure updates of a blacklist which shows whether an object is invalid.

The stated aim can be achieved by a judgment device which judges whether an object is invalid using a blacklist. The judgment device includes: a holding unit operable to hold the blacklist showing whether the object is invalid, and a whitelist showing whether the judgment device is valid; a judgment unit operable to judge whether the whitelist needs to be updated; an acquisition unit operable to acquire together a latest blacklist and a latest whitelist, if the whitelist is judged as needing to be updated; and an update unit operable to write together the latest blacklist and the latest whitelist respectively over the blacklist and the whitelist in the holding unit.

The whitelist shows whether the device itself is valid. Accordingly, the device gains a benefit from updating the whitelist. If the device does not update the whitelist, the object may refuse to communicate with the device.

According to the above construction, when updating such a whitelist, the device updates the blacklist too. In this way, updates of the blacklist can be ensured.

Here, the object may be a storage medium used for storing information, wherein the holding unit holds a medium blacklist showing whether the storage medium is invalid, as the blacklist, the acquisition unit acquires a latest medium blacklist as the latest blacklist, and the update unit writes the latest medium blacklist over the medium blacklist in the holding unit.

According to the above construction, a storage medium can be treated as the object.

Here, the object may be a digital work, wherein the holding unit holds a work blacklist showing whether the digital work is invalid, as the blacklist, the acquisition unit acquires a latest work blacklist as the latest blacklist, and the update unit writes the latest work blacklist over the work blacklist in the holding unit.

According to the above construction, a digital work can be treated as the object.

Here, the object may be an information acquisition device, wherein the holding unit holds a device blacklist showing whether the information acquisition device is invalid, as the blacklist, the acquisition unit acquires a latest device blacklist as the latest blacklist, and the update unit writes the latest device blacklist over the device blacklist in the holding unit.

According to the above construction, an information acquisition device can be treated as the object.

Here, the information acquisition device may be a medium access device for any of writing information to and reading information from a storage medium used for storing information.

According to the above construction, a medium access device can be treated as the object.

Here, the information acquisition device may be a digital broadcast reception device for receiving information which is broadcast by digital broadcasting.

According to the above construction, a digital broadcast reception device can be treated as the object.

Here, the judgment unit may make the judgment using information about a generation of the whitelist.

According to the above construction, it is possible to reliably judge which whitelist is newer.

BRIEF DESCRIPTION OF DRAWINGS

FIG. 4 shows an example data structure of a list H.

FIG. 13 shows an example data structure of a certificate identifier list 700.

FIG. 14 shows an example data structure of a certificate identifier list 800.

DETAILED DESCRIPTION OF THE INVENTION

1. First Embodiment

The following describes an authentication system 10 which is a first embodiment of the present invention.

1.1. Construction of the Authentication System 10

Figure 1:
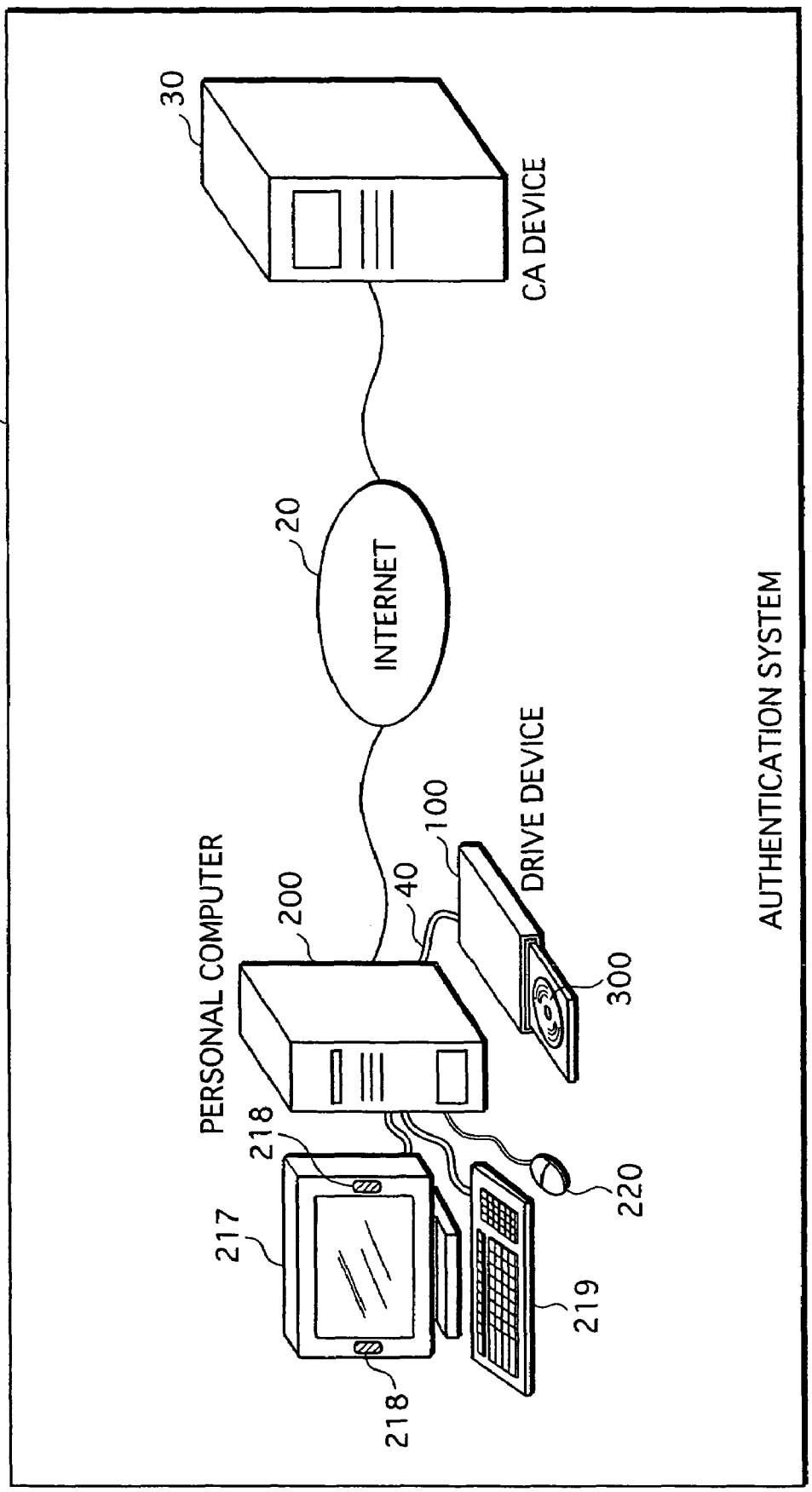
FIG. 1 shows an overall construction of an authentication system 10 to which the present invention relates.

The authentication system 10 is roughly made up of a drive device 100, a personal computer 200, and a CA (Certification Authority) device 30, as shown in FIG. 1.

The personal computer 200 is connected to the CA device 30 via an internet 20.

The drive device 100 and the personal computer 200 are connected together by a general-purpose communications channel 40. Here, since specifications of the communications channel 40 are made public, the communications channel 40 is unsafe against unauthorized acts such as eavesdropping, tampering, and replacement of data.

The CA device 30 issues public key certificates attesting to the validity of public keys. The CA device 30 also issues a list which shows whether a public key certificate of the drive device 100 is invalid (hereafter "list D"), and a list which shows whether a public key certificate of the personal computer 200 is valid (hereafter "list H"). The personal computer 200 holds the list D and the list H in advance.

Also, a storage medium 300 on which encrypted content is stored is inserted in the drive device 100.

The personal computer 200 searches the list D held therein, to judge whether the public key certificate of the drive device 100 with which the personal computer 200 is communicating is invalid. The personal computer 200 also searches the list H held therein, and sends partial data of the list H, which indicates the public key certificate of the personal computer 200 is valid, to the drive device 100 with which the personal computer 200 is communicating. This enables the drive device 100 to judge the validity of the personal computer 200 only by checking the partial data of the list H sent from the personal computer 200. Hence a processing load of the drive device 100 can be reduced.

When the list H which shows the validity of the public key certificate of the personal computer 200 needs to be updated, the personal computer 200 connects to the CA device 30 via the internet 20 and acquires an updated version of the list H from the CA device 30. When doing so, the personal computer 200 also acquires an updated version of the list D.

The drive device 100 and the personal computer 200 then perform one-way authentication or two-way authentication. If the authentication has succeeded, the drive device 100 reads the encrypted content from the storage medium 300, and sends the encrypted content to the personal computer 200. The personal computer 200 receives the encrypted content from the drive device 100, decrypts the encrypted content, and plays back the decrypted content.

1.2. Construction of the Storage Medium 300

The storage medium 300 is, for example, a DVD (Digital Versatile Disc) that is a large-capacity optical disc medium for recording video, audio, computer data, or the like.

Figure 2:
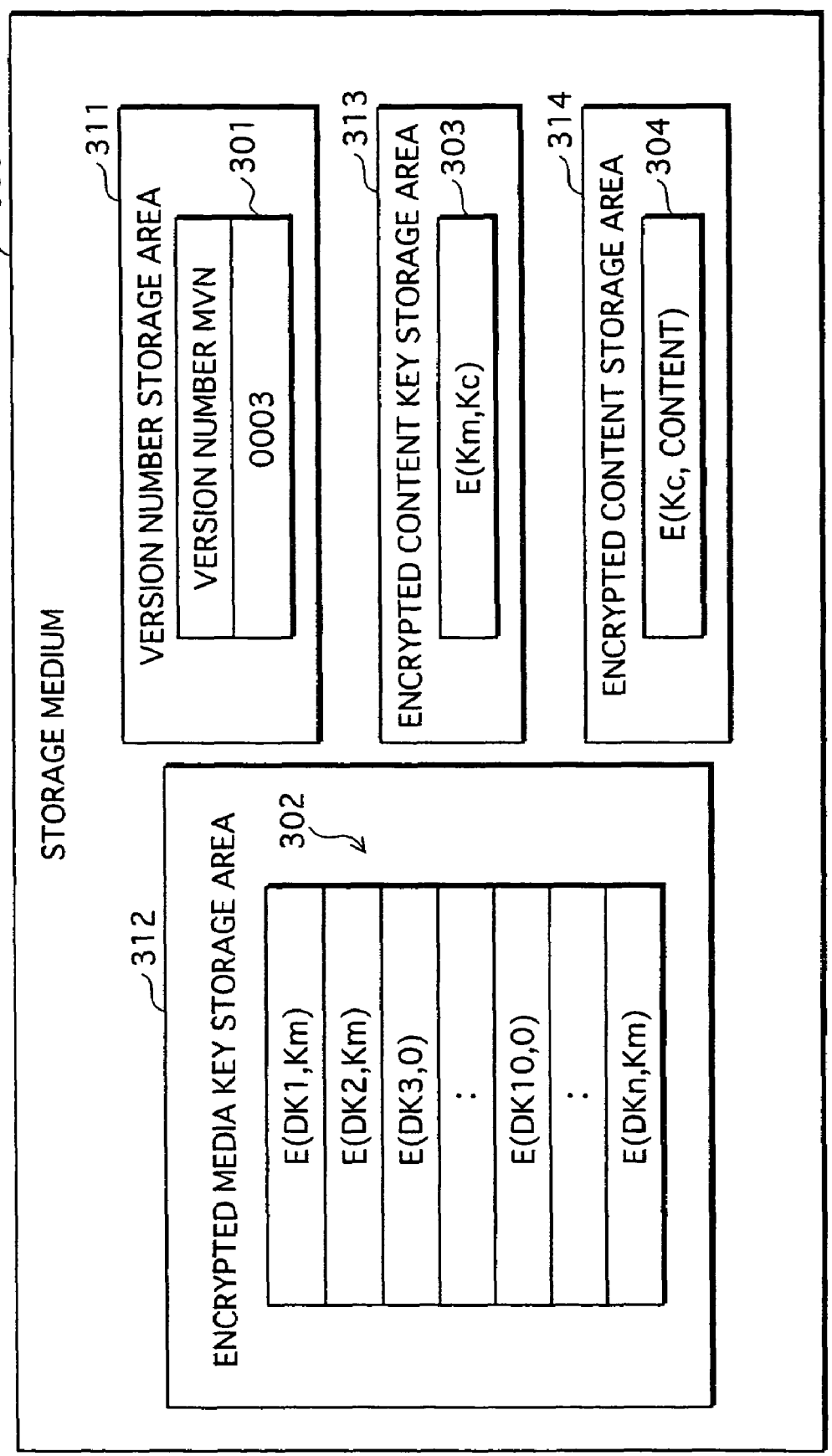
FIG. 2 shows an example structure of data stored on a storage medium 300.

The storage medium 300 has a version number storage area 311, an encrypted media key storage area 312, an encrypted content key storage area 313, and an encrypted content storage area 314, as shown in FIG. 2. The version number storage area 311 stores a version number MVN 301. The encrypted media key storage area 312 stores an encrypted media key set 302. The encrypted content key storage area 313 stores an encrypted content key 303. The encrypted content storage area 314 stores encrypted content 304.

The version number MVN 301 specifies a generation of the lists D and H that is to be applied when using the data stored on the storage medium 300. In FIG. 2, the version number MVN 301 is "0003" as one example. The version number MVN 301 is expressed by a numeric value, with a larger numeric value indicating a newer generation. The same applies to other version numbers in this specification.

The encrypted media key set 302 is formed so as to provide a media key only to specific devices. In detail, the encrypted media key set 302 is generated by encrypting a media key Km using a device key DK of each device permitted to have the media key Km, and encrypting dummy data, which is completely irrelevant to the media key Km, using a device key DK of each device not permitted to have the media key Km.

The encrypted media key set 302 is made up of n encrypted media keys. Here, "n" represents a total number of devices belonging to the authentication system 10. Hence the n encrypted media keys correspond to the n devices. Each encrypted media key is generated by applying an encryption algorithm E to the media key Km or the dummy data which is completely irrelevant to the media key Km, using a device key $DK_i$ of a device corresponding to the encrypted media key. The media key Km is key information unique to the data stored on the storage medium 300. For example, an encrypted media key generated by encrypting the media key Km using a device key DK1 of a first device is denoted by E(DK1,Km). In this specification, E(A,B) is ciphertext generated by applying the encryption algorithm E to plaintext B using a key A.

In FIG. 2, the encrypted media key set 302 includes encrypted media keys E(DK3,0) and E(DK10,0). These encrypted media keys indicate that a device having a device key DK3 and a device having a device key DK10 are not permitted to have the media key Km.

The encrypted content key 303 is generated by applying the encryption algorithm E to a content key Kc using the media key Km:

(encrypted content key)=*E*(*Km,Kc*)

The encrypted content 304 is generated by applying the encryption algorithm E to content C using the content key Kc.

The encrypted algorithm E used here is, for example, an algorithm of DES (Data Encryption Standard) that is a secret key cipher.

1.3. Structures of the List D and the List H

Example structures of the list D used for judging whether the drive device 100 is invalid and the list H used for judging whether the personal computer 200 is valid are described below.

(1) Structure of the List D

Figure 3:
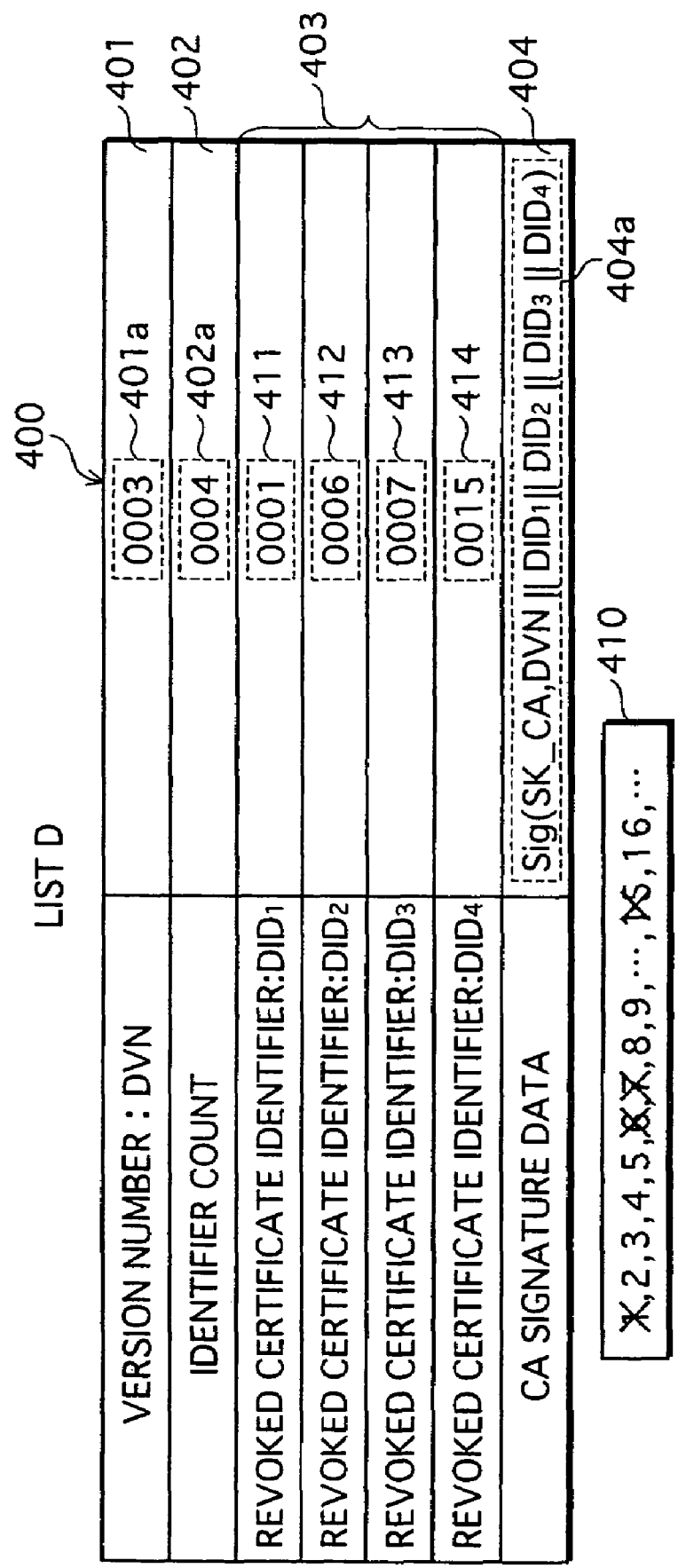
FIG. 3 shows an example data structure of a list D.

FIG. 3 shows a list D 400. The list D 400 indicates that four public key certificates identified by identifiers DID=1, 6, 7, and 15 are revoked while public key certificates identified by other identifiers are unrevoked. Each identifier is shown in a box 410 in FIG. 3. In the box 410, a crossed number corresponds to an identifier of a revoked public key certificate, whereas an uncrossed number corresponds to an identifier of an unrevoked public key certificate.

As shown in FIG. 3, the list D 400 has a version number field 401, an identifier count field 402, a revoked certificate identifier field 403, and a signature field 404. The version number field 401 contains a version number DVN 401*a*. The identifier count field 402 contains an identifier count 402*a*. The revoked certificate identifier field 403 contains four revoked certificate identifiers $DID_1$ 411, $DID_2$ 412, $DID_3$ 413, and $DID_4$ 414. The signature field 404 contains CA signature data 404*a*.

The version number DVN 401*a* specifies a generation of the list D 400. The version number DVN 401*a* is "0003" in the example of FIG. 3.

The identifier count 402*a* shows a number of revoked certificate identifiers in the revoked certificate identifier field 403. The identifier count 402*a* is "0004" in the example of FIG. 3.

The revoked certificate identifiers $DID_1$ 411, $DID_2$ 412, $DID_3$ 413, and $DID_4$ 414 show identifiers of revoked public key certificates. The revoked certificate identifiers $DID_1$ 411, $DID_2$ 412, $DID_3$ 413, and $DID_4$ 414 are "0001", "0006", "0007", and "0015" respectively, in the example of FIG. 3.

The CA signature data 404*a* is signature data generated by the CA to attest to the validity of the above fields. In more detail, the CA signature data 404*a* is generated by applying a digital signature algorithm Sig to concatenation data obtained by concatenating the version number DVN 401*a* and the four revoked certificate identifiers $DID_1$ 411, $DID_2$ 412, $DID_3$ 413, and $DID_4$ 414 in this order, using the CA's secret key SK_CA:

(CA Signature Data)=Sig(SK_CA, DVN∥$DID_1$∥$DID_2$∥$DID_3$∥$DID_4$)

where ∥ denotes concatenation of preceding and succeeding data, and Sig(X,Y) denotes a signature generation function of applying the digital signature algorithm Sig to data Y using key data X. Also, SK_CA is a secret key which is held by the CA alone and used for signature generation.

The CA signature data 404*a* is used to prove that the data in each field of the list D 400 is correct.

As described above, the list D 400 enumerates the identifiers of the revoked public key certificates. Accordingly, the list D 400 is also called a blacklist.

In the above example, the CA signature data is generated by signing the data contained in the list D 400 except the CA signature data itself and the identifier count. Alternatively, the CA signature data may be generated by signing the data except only the CA signature data itself.

In the above example, the CA signature data is generated from the concatenation data, but the present invention is not limited to this. For example, the CA signature data may be generated from a hash value of the concatenation data. Also, the CA signature data is not limited to an appendix-type signature, and may be a recovery-type signature with which the data subjected to be signed is obtained after the signature verification. In this case, the list D does not have the revoked certificate identifier field. Instead, the revoked certificate identifiers are obtained from the CA signature data when the signature verification is performed.

(2) Structure of the List H

FIG. 4 shows a list H 500. The list H 500 indicates that seven public key certificates identified by identifiers HID=1, 5, 9, and 13 to 16 are revoked whereas public key certificates identified by other identifiers are unrevoked. Each identifier is shown in a box 520 in FIG. 4. In the box 520, a crossed number corresponds to an identifier of a revoked public key certificate, while an uncrossed number corresponds to an identifier of an unrevoked public key certificate.

In the box 520, a first uncrossed number section 521 is composed of an identifier set {2, 3, 4}, a second uncrossed number section 522 is composed of an identifier set {6, 7, 8}, a third uncrossed number section 523 is composed of an identifier set {10, 11, 12}, and a fourth uncrossed number section 524 is composed of an identifier set {17, 18, . . . , 9999}.

As shown in FIG. 4, the list H 500 has a version number field 501, a pair count field 502, an unrevoked certificate identifier field 511, and a signature field 512. The version number field 501 contains a version number HVN 501*a*. The pair count field 502 contains a pair count 502*a*. The unrevoked certificate identifier field 511 contains eight identifiers 503*a*, 503*b*, 504*a*, 504*b*, 505*a*, 505*b*, 506*a*, and 506*b*. The signature field 512 contains four sets of CA signature data 507 to 510.

The version number HVN 501*a* specifies a generation of the list H 500. The version number HVN 501*a* is "0003" in the example of FIG. 4.

The pair count 502*a* shows a number of sections which are each a group of consecutive identifiers of unrevoked public key certificates. The pair count 502*a* is "0004" in the example of FIG. 4, indicating there are four such sections.

The two identifiers 503*a* and 503*b* constitute a pair 503. The two identifiers 504*a* and 504*b* constitute a pair 504. The two identifiers 505*a* and 505*b* constitute a pair 505. The two identifiers 506*a* and 506*b* constitute a pair 506. Each of these pairs is constituted by first and last identifiers of a section in which identifiers of unrevoked public key certificates are consecutive.

In the example of FIG. 4, the pair 503 shows the section 521 which begins with the identifier "0002" and ends with the identifier "0004". The pair 504 shows the section 522 which begins with the identifier "0006" and ends with the identifier "0008". The pair 505 shows the section 523 which begins with the identifier "0010" and ends with the identifier "0012". The pair 506 shows the section 524 which begins with the identifier "0017" and ends with the identifier "9999".

The signature field 512 contains the four sets of CA signature data 507 to 510. The CA signature data 507 corresponds to the pair 503, the CA signature data 508 corresponds to the pair 504, the CA signature data 509 corresponds to the pair 505, and the CA signature data 510 corresponds to the pair 506.

The four sets of CA signature data 507 to 510 are each generated by the CA for attesting to the validity of the data of the corresponding pair.

The CA signature data 507 is generated by applying the digital signature algorithm Sig to concatenation data obtained by concatenating the version number HVN 501*a* and the identifiers $HID_1$ 503*a* and $HID_2$ 503*b* in the pair 503 in this order, using the CA's secret key SK_CA:

(CA signature data)=Sig(SK_CA,HVN∥$HID_1$∥$HID_2$)

The CA signature data 508 is generated by applying the digital signature algorithm Sig to concatenation data obtained by concatenating the version number HVN 501*a* and the identifiers $HID_3$ 504*a* and $HID_4$ 504*b* in the pair 504 in this order, using the CA's secret key SK_CA:

(CA signature data)=Sig(SK_CA,HVN∥$HID_3$∥$HID_4$)

The CA signature data 509 is generated by applying the digital signature algorithm Sig to concatenation data obtained by concatenating the version number HVN 501*a* and the identifiers $HID_5$ 505*a* and $HID_6$ 505*b* in the pair 505 in this order, using the CA's secret key SK_CA:

(CA signature data)=Sig(SK_CA,HVN∥$HID_5$∥$HID_6$)

The CA signature data 510 is generated by applying the digital signature algorithm Sig to concatenation data obtained by concatenating the version number HVN 501*a* and the identifiers $HID_7$ 506*a* and $HID_8$ 506*b* in the pair 506 in this order, using the CA's secret key SK_CA:

(CA signature data)=Sig(SK_CA,HVN∥$HID_7$∥$HID_8$)

Thus, the list H 500 enumerates the identifiers of the unrevoked public key certificates. Accordingly, the list H 500 is also called a whitelist.

The four sets of CA signature data 507 to 510 are each used to prove that the data of the corresponding section of the unrevoked certificate identifier field 511 in the list H 500 is correct.

In the above example, the CA signature data is generated from the concatenation data, but the present invention is not limited to this. For example, the CA signature data may be generated from a hash value of the concatenation data. Also, the CA signature data is not limited to an appendix-type signature, and may be a recovery-type signature with which the data subjected to be signed is obtained after the signature verification. In this case, the list H does not have the unrevoked certificate identifier field. Instead, the first and last identifiers of each unrevoked certificate identifier section are obtained from the CA signature data when the signature verification is performed.

1.4. Construction of the Drive Device 100

Figure 5:
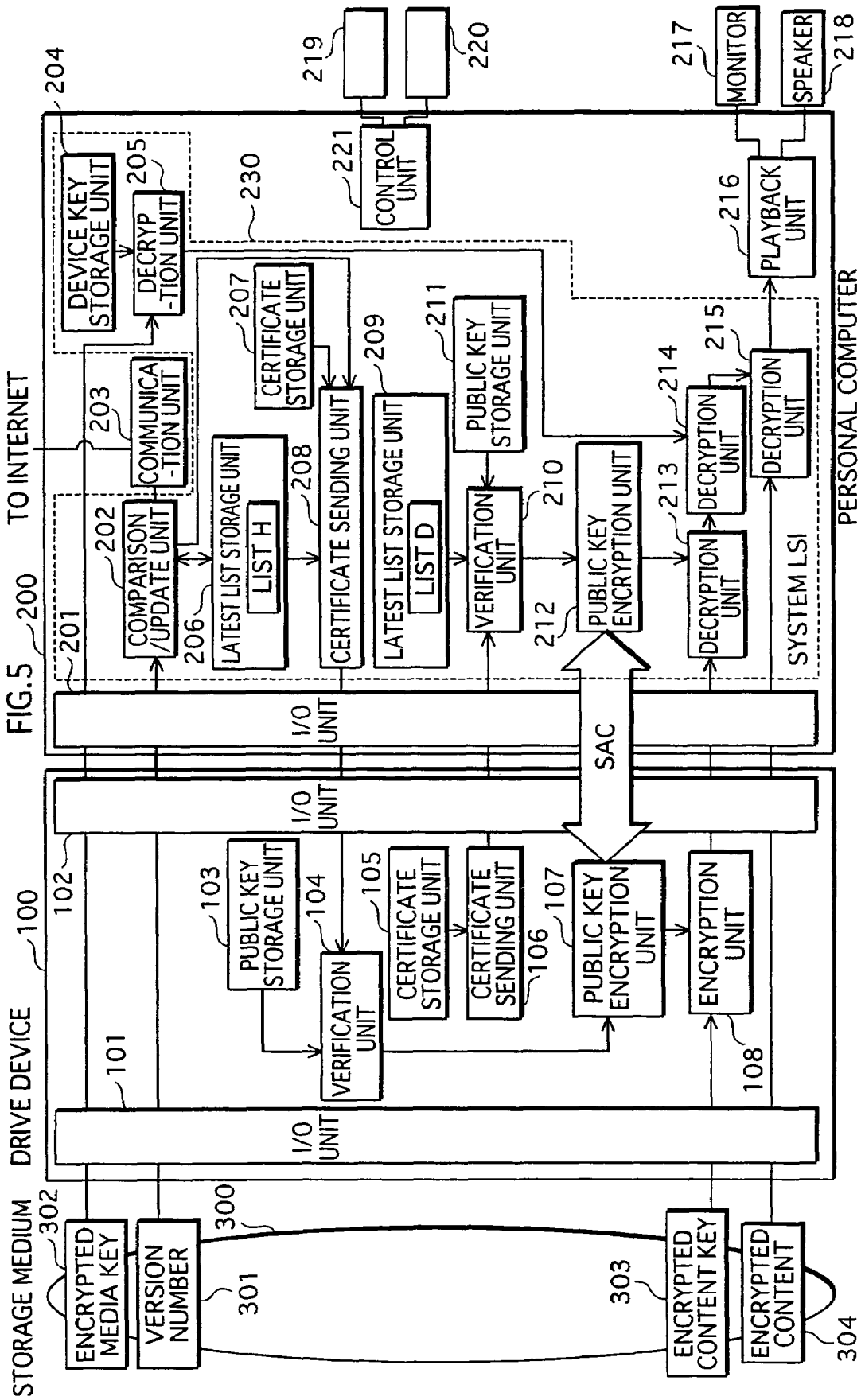
FIG. 5 is a block diagram showing constructions of a drive device 100 and a personal computer 200.
Figure 6:
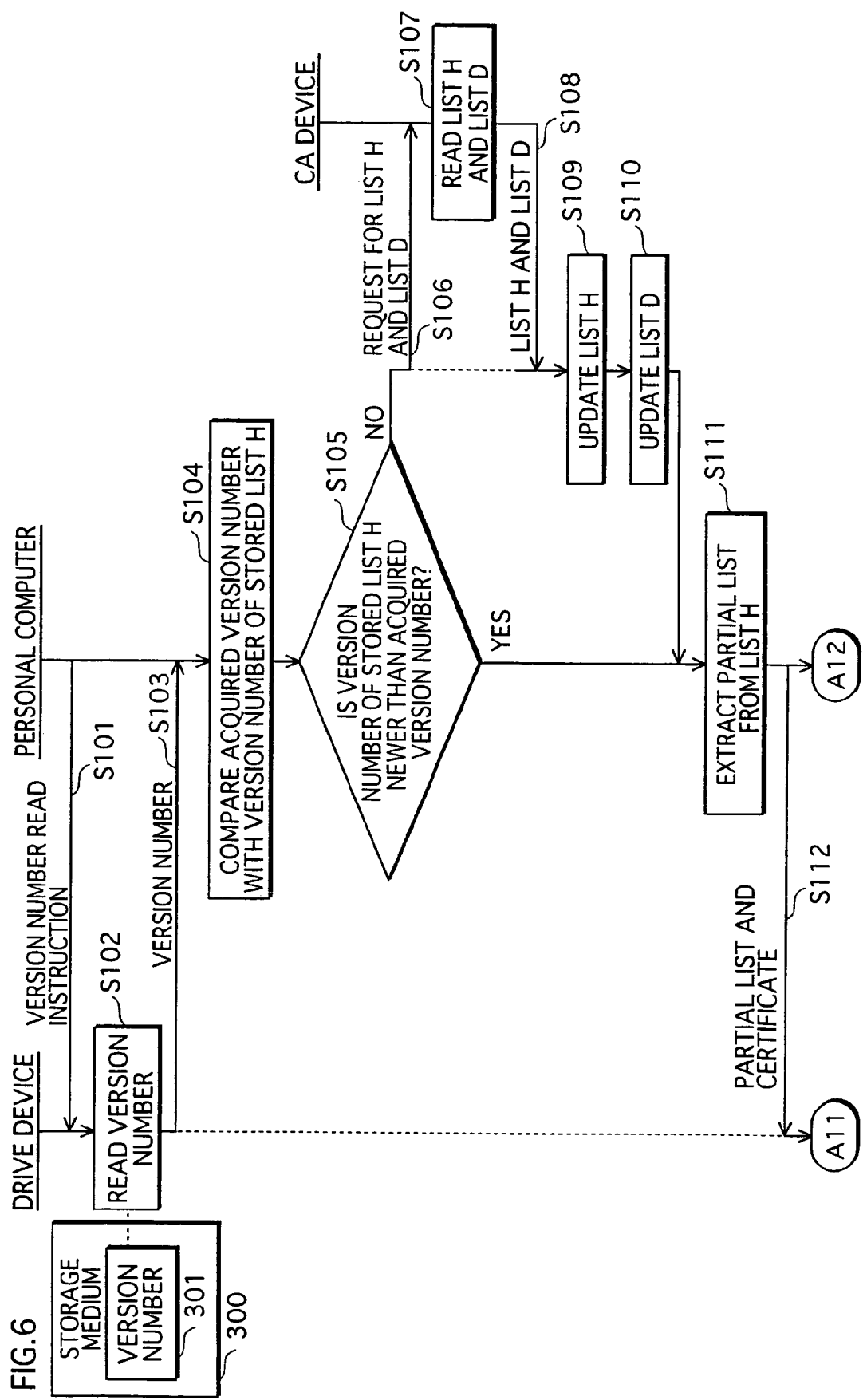
FIG. 6 is a flowchart showing a main operation of the authentication system 10, continuing to FIG. 7.
Figure 7:
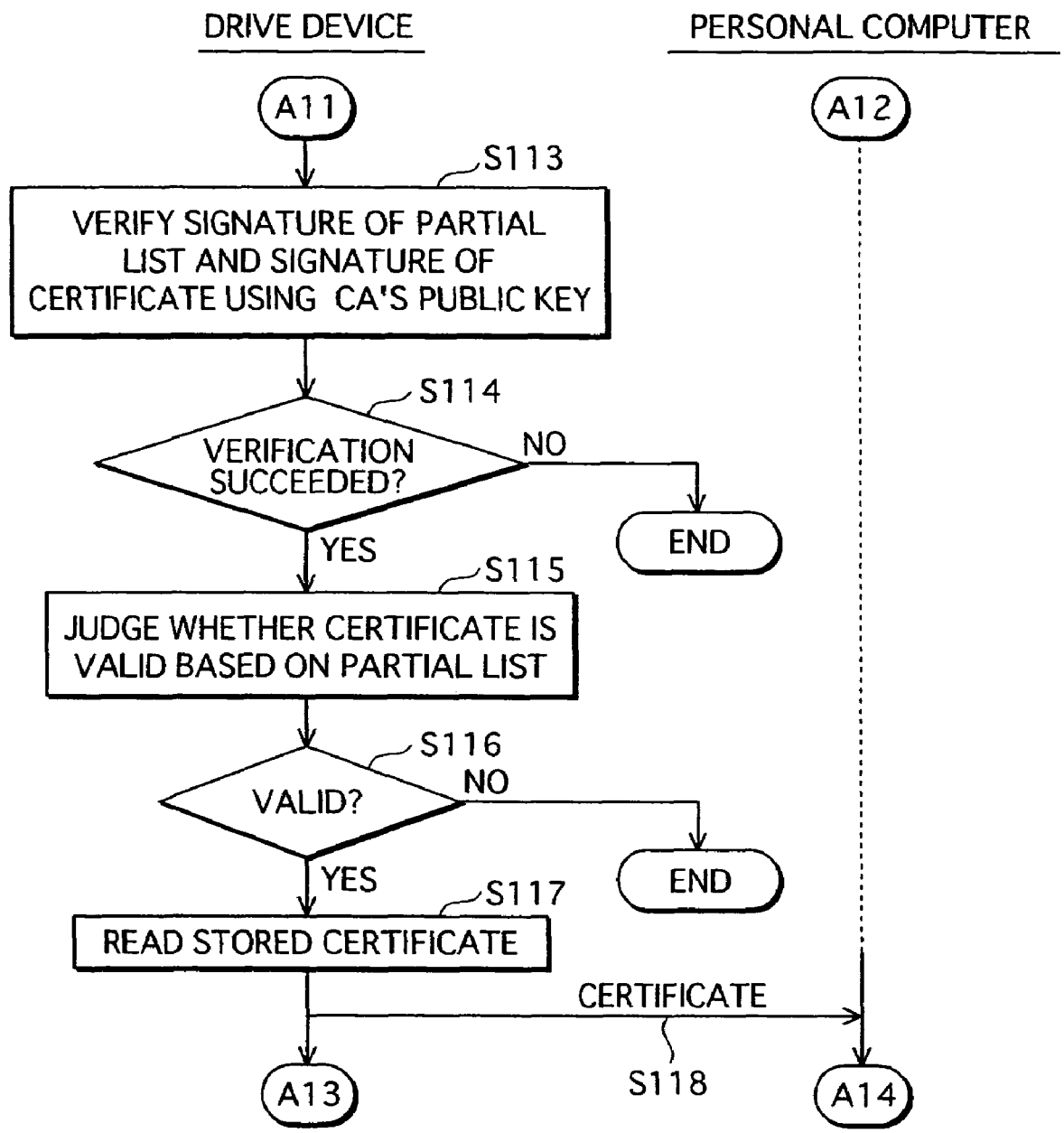
FIG. 7 is a flowchart showing the main operation of the authentication system 10, continuing to FIG. 8.
Figure 8:
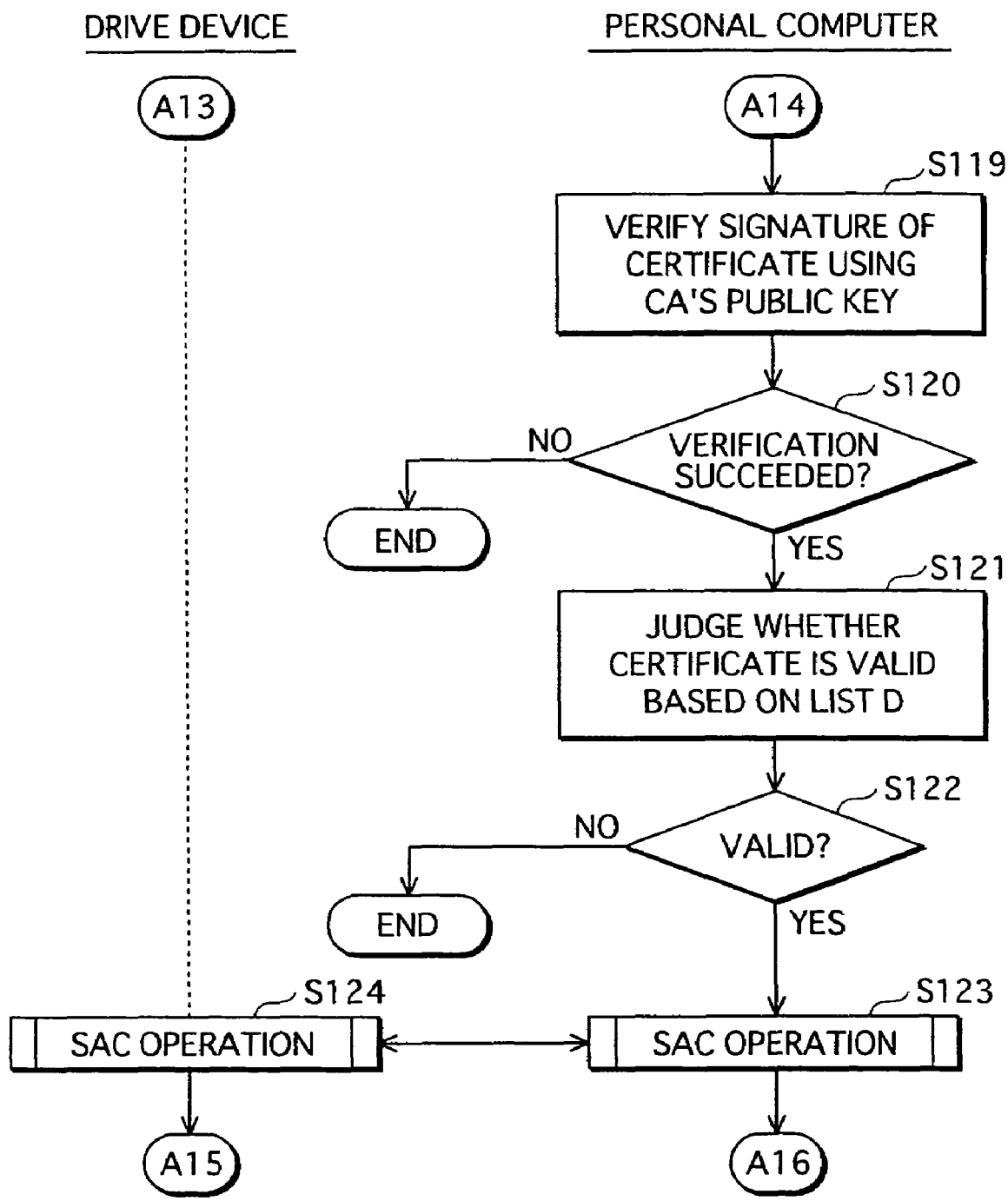
FIG. 8 is a flowchart showing the main operation of the authentication system 10, continuing to FIG. 9.
Figure 9:
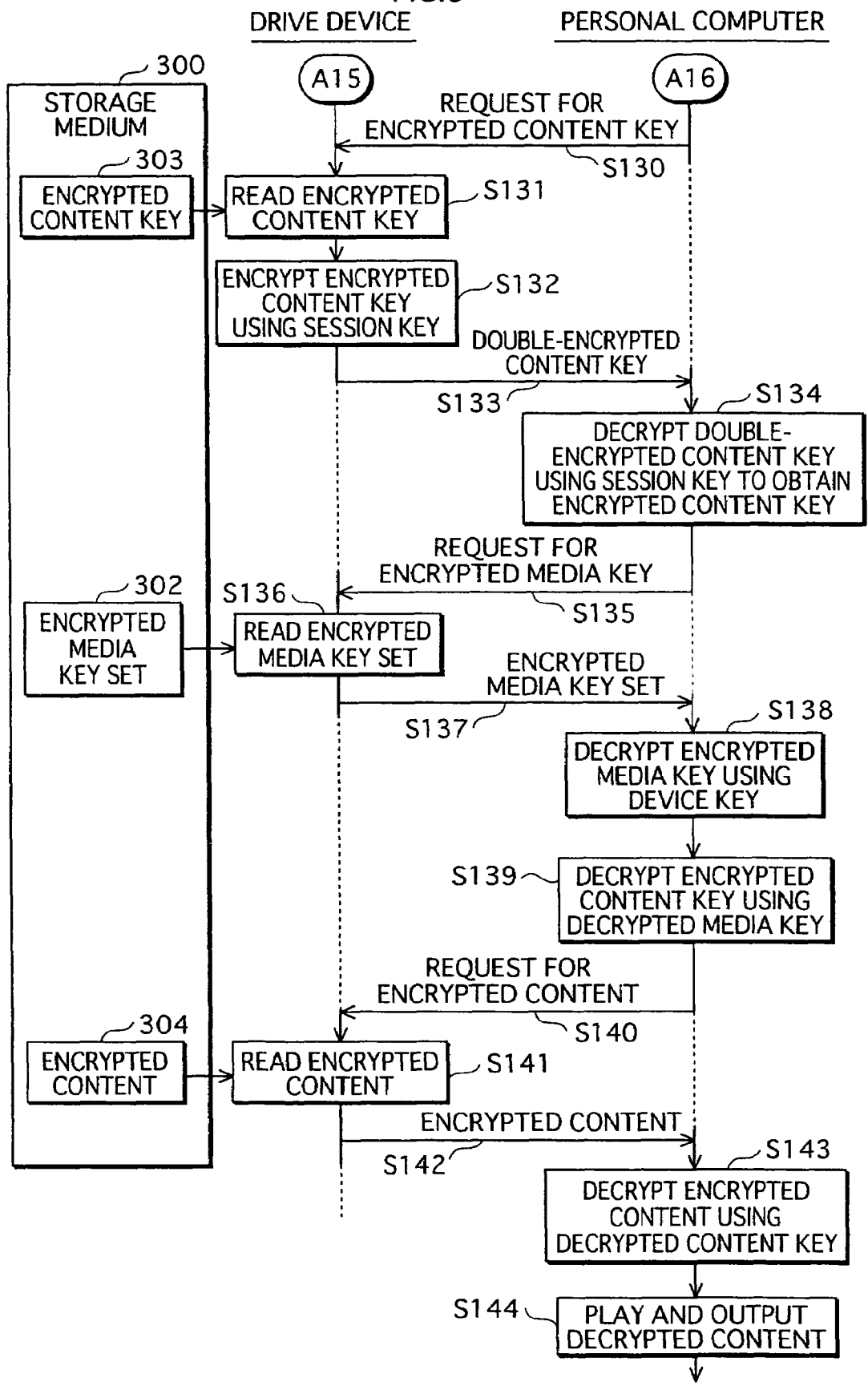
FIG. 9 is a flowchart showing the main operation of the authentication system 10, continuing from FIG. 8.

The drive device 100 includes an I/O (input-output) unit 101, an I/O unit 102, a public key storage unit 103, a verification unit 104, a certificate storage unit 105, a certificate sending unit 106, a public key encryption unit 107, and an encryption unit 108, as shown in FIG. 5.

(1) I/O Units 101 and 102

The I/O unit 101, according to an instruction from another construction element in the drive device 100, reads information from the storage medium 300 and outputs the read information to that construction element.

The I/O unit 102, according to an instruction from another construction element in the drive device 100, receives information from that construction element and outputs the received information to the personal computer 200. Also, the I/O unit 102 receives information from the personal computer 200 and outputs the received information to another construction element in the drive device 100, according to an instruction from the personal computer 200.

(2) Public Key Storage Unit 103 and Certificate Storage Unit 105

The public key storage unit 103 stores the CA's public key PK_CA in advance. A manufacturer of the drive device 100 acquires the CA's public key PK_CA from the CA, and writes it to the public key storage unit 103 at the time of manufacture.

The certificate storage unit 105 stores a public key certificate of the drive device 100 in advance. The manufacturer of the drive device 100 acquires the public key certificate of the drive device 100 from the CA, and writes it to the certificate storage unit 105 at the time of manufacture.

The public key certificate of the drive device 100 is created by the CA, and contains a public key of the drive device 100, an identifier of the public key certificate, CA signature data for proving the validity of the public key, and the like.

(3) Verification Unit 104

The verification unit 104 receives a partial list and a public key certificate from the personal computer 200 via the I/O unit 102. The verification unit 104 reads the CA's public key PK_CA from the public key storage unit 103, and verifies CA signature data included in the received partial list using the CA's public key PK_CA. If the signature verification has failed, the verification unit 104 terminates subsequent processing. If the signature verification has succeeded, the verification unit 104 further verifies CA signature data included in the received public key certificate using the CA's public key PK_CA. If the signature verification has failed, the verification unit 104 terminates subsequent processing.

If the signature verification has succeeded, the verification unit 104 further checks whether the public key certificate is valid, based on the partial list. In detail, the verification unit 104 judges whether the partial list shows an identifier included in the public key certificate. If the partial list shows the identifier, the verification unit 104 judges that the public key certificate is valid. If the partial list does not show the identifier, the verification unit 104 judges that the public key certificate is invalid. If the public key certificate is invalid, the verification unit 104 terminates subsequent processing. If the public key certificate is valid, the verification unit 104 outputs verification success information indicating the verification success, to the public key encryption unit 107.

(4) Certificate Sending Unit 106

The certificate sending unit 106 reads the public key certificate of the drive device 100 from the certificate storage unit 105, and outputs the read public key certificate to the personal computer 200 via the I/O unit 102.

(5) Public Key Encryption Unit 107

The public key encryption unit 107 performs authentication and key sharing for establishing a SAC (Secure Authentication Channel) which enables secure transfer of information to be performed on the general-purpose communications channel 40 between the drive device 100 and the personal computer 200. In the key sharing, the public key encryption unit 107 generates a session key to be shared with the personal computer 200.

(6) Encryption Unit 108

The encryption unit 108 reads the encrypted content key 303 from the storage medium 300 via the I/O unit 101, and applies an encryption algorithm to the encrypted content key 303 using the session key generated by the public key encryption unit 107 to generate a double-encrypted content key. The encryption unit 108 outputs the double-encrypted content key to the personal computer 200 via the I/O unit 102.

1.5. Construction of the Personal Computer 200

The personal computer 200 includes an I/O unit 201, a system LSI (Large Scale Integrated circuit) 230, a communication unit 203, a playback unit 216, and a control unit 221 as shown in FIG. 5, as well as other construction elements not shown in the drawing.

The personal computer 200 is actually realized by a computer system that includes the system LSI, a microprocessor, a ROM, a RAM, a bus, a hard disk unit, a communication unit, and the like. A computer program is stored on the RAM or the hard disk unit. Part of the functions of the personal computer 200 is achieved by the microprocessor operating in accordance with this computer program.

The system LSI 230 includes a comparison/update unit 202, a device key storage unit 204, a decryption unit 205, a latest list storage unit 206, a certificate storage unit 207, a certificate sending unit 208, a latest list storage unit 209, a verification unit 210, a public key storage unit 211, a public key encryption unit 212, a decryption unit 213, a decryption unit 214, and a decryption unit 215, as shown in FIG. 5.

The system LSI 230 is a super-multifunction LSI that is produced by integrating the above construction elements on a single chip. The system LSI 230 is actually realized by a computer system that includes a microprocessor, a ROM, a RAM, and the like. A computer program is stored on the RAM. Part of the functions of the system LSI 230 is achieved by the microprocessor operating in accordance with this computer program.

(1) Certificate Storage Unit 207, Latest List Storage Unit 206, Latest List Storage Unit 209, Public Key Storage Unit 211, and Device Key Storage Unit 204

The certificate storage unit 207 stores a public key certificate of the personal computer 200 in advance. A manufacturer of the personal computer 200 acquires the public key certificate of the personal computer 200 from the CA, and writes it to the certificate storage unit 207 at the time of manufacture.

The public key certificate of the personal computer 200 is created by the CA, and contains a public key of the personal computer 200, an identifier of the public key certificate, CA signature data for proving the validity of the public key, and the like.

The latest list storage unit 206 stores the list H which shows whether the public key certificate of the personal computer 200 is valid, in advance. The list H is as explained above. The manufacturer of the personal computer 200 acquires the list H from the CA, and writes it to the latest list storage unit 206 at the time of manufacture.

The latest list storage unit 209 stores the list D which shows whether the public key certificate of the drive device 100 is invalid, in advance. The list D is as explained above. The manufacturer of the personal computer 200 acquires the list D from the CA, and writes it to the latest list storage unit 209 at the time of manufacture.

The public key storage unit 211 stores the CA's public key PK_CA in advance. The manufacturer of the personal computer 200 acquires the CA's public key PK_CA from the CA, and writes it to the public key storage unit 211 at the time of manufacture.

The device key storage unit 204 stores a device key $DK_j$ assigned to the personal computer 200, in advance. The manufacturer of the personal computer 200 writes the device key $DK_j$ to the device key storage unit 204 at the time of manufacture.

(2) I/O Unit 201

The I/O unit 201, according to an instruction from another construction element in the personal computer 200, receives information from that construction element and outputs the received information to the drive device 100. Also, the I/O unit 201 receives information from the drive device 100, and outputs the received information to another construction element in the personal computer 200 depending on a type of the information.

(3) Comparison/Update Unit 202

The comparison/update unit 202 receives the version number MVN 301 of the lists D and H from the storage medium 300 via the drive device 100 and the I/O unit 201. The comparison/update unit 202 reads the version number HVN of the list H from the latest list storage unit 206, and compares the version number MVN and the version number HVN to judge which version number is newer. In more detail, the comparison/update unit 202 checks which of the version number MVN and the version number HVN is larger, and judges the larger version number as being the newer version number. If the version number HVN is older than the version number MVN, the comparison/update unit 202 judges that the list H stored in the latest list storage unit 206 is old. In this case, the comparison/update unit 202 connects to the CA device 30 via the communication unit 203 and the internet 20, and acquires a latest version of the list H and a latest version of the list D from the CA device 30 via the internet 20 and the communication unit 203. The comparison/update unit 202 writes the corresponding latest version over the list H stored in the latest list storage unit 206, and writes the corresponding latest version over the list D stored in the latest list storage unit 209.

(4) Certificate Sending Unit 208

The certificate sending unit 208 reads the public key certificate of the personal computer 200 from the certificate storage unit 207. The certificate sending unit 208 also extracts, from the list H in the latest list storage unit 206, a partial list that contains a version number, a pair of identifiers corresponding to a section to which the identifier of the public key certificate of the personal computer 200 belongs, and CA signature data for the version number and the pair of identifiers. The certificate sending unit 208 outputs the read public key certificate and the extracted partial list to the drive device 100 via the I/O unit 201.

Suppose the identifier of the public key certificate of the personal computer 200 is "0007". This being the case, the certificate sending unit 208 extracts the version number HVN 501a, the pair of identifiers $HID_3$ 504a and $HID_4$ 504b corresponding to the section including the identifier "0007", and the CA signature data 508 from the list H 500, as the partial list.

The certificate sending unit 208 outputs the read public key certificate and the extracted partial list to the drive device 100 via the I/O unit 201.

(5) Verification Unit 210

The verification unit 210 receives the public key certificate of the drive device 100 from the drive device 100 via the I/O unit 201. The verification unit 210 reads the CA's public key PK_CA from the public key storage unit 211, and verifies the CA signature data included in the public key certificate of the drive device 100 using the CA's public key PK_CA. If the signature verification has failed, the verification unit 210 terminates subsequent processing. If the signature verification has succeeded, the verification unit 210 further judges whether the public key certificate of the drive device 100 is invalid, based on the list D stored in the latest list storage unit 209. In detail, the verification unit 210 checks whether the list D shows the identifier included in the public key certificate. If the list D shows the identifier, the verification unit 210 judges the public key certificate as being invalid, and terminates subsequent processing. If the list D does not show the identifier, the verification unit 210 judges the public key certificate as being valid, and outputs the judgment result to the public key encryption unit 212.

(6) Public Key Encryption Unit 212

The public key encryption unit 212 executes authentication and key sharing for establishing a SAC which enables secure transfer of information to be performed on the general-purpose communications channel 40 between the personal computer 200 and the drive device 100. In the key sharing, the public key encryption unit 212 generates the session key to be shared with the drive device 100.

(7) Decryption Unit 213

The decryption unit 213 receives the double-encrypted content key from the drive device 100 via the I/O unit 201. The decryption unit 213 applies a decryption algorithm to the double-encrypted content key using the session key generated by the public key encryption unit 212 to obtain the encrypted content key, and outputs the encrypted content key to the decryption unit 214.

(8) Decryption Unit 205

The decryption unit 205 receives the encrypted media key set 302 from the storage medium 300 via the drive device 100 and the I/O unit 201, and extracts an encrypted media key corresponding to the personal computer 200 from the received encrypted media key set 302. The decryption unit 205 also reads the device key $DK_j$ from the device key storage unit 204, and applies a decryption algorithm to the encrypted media key using the device key $DK_j$. The decryption unit 205 outputs the decrypted media key to the decryption unit 214.

A method of providing a media key only to specific devices can be realized using known techniques in the art and so its detailed explanation has been omitted here. On example of such techniques is key management that adopts a tree structure.

(9) Decryption Unit 214

The decryption unit 214 receives the encrypted content key from the decryption unit 213, and the decrypted media key from the decryption unit 205. The decryption unit 214 applies a decryption algorithm to the encrypted content key using the decrypted media key, and outputs the decrypted content key to the decryption unit 215.

(10) Decryption Unit 215

The decryption unit 215 receives the decrypted content key from the decryption unit 214, and the encrypted content 304 from the storage medium 300 via the drive device 100 and the I/O unit 201. The decryption unit 215 applies a decryption algorithm to the encrypted content using the decrypted content key, and outputs the decrypted content to the playback unit 216.

(11) Playback Unit 216

The playback unit 216 receives the decrypted content from the decryption unit 215, and applies algorithms for decoding, decompression, and the like to the decrypted content to generate digital video and audio data. The playback unit 216 converts the digital video and audio data to analog video and audio signals, and outputs the analog video and audio signals respectively to a monitor 217 and a speaker 218.

1.6. Operation of the Authentication System 10

(1) Main Operation of the Authentication System 10

A main operation of the authentication system 10 is described below, by referring to flowcharts of FIGS. 6 to 9.

In the personal computer 200, the comparison/update unit 202 outputs a version number read instruction to the drive device 100 via the I/O unit 201 (S101).

In the drive device 100, the I/O unit 102 receives the version number read instruction (S101) The I/O unit 101 reads the version number MVN 301 from the storage medium 300 (S102), and outputs it to the personal computer 200 via the I/O unit 102 (S103).

In the personal computer 200, the comparison/update unit 202 receives the version number MVN 301 from the drive device 100 via the I/O unit 201 (S103). The comparison/update unit 202 reads the version number HVN of the list H from the latest list storage unit 206, and compares the version number MVN and the version number HVN (S104). If the version number HVN is older than the version number MVN (S105), the comparison/update unit 202 requests the list H and the list D from the CA device 30 via the communication unit 203 and the internet 20 (S106).

Upon receiving the request (S106), the CA device 30 reads a latest version of the list H and a latest version of the list D (S107), and sends them to the personal computer 200 via the internet 20 (S108).

The comparison/update unit 202 receives the latest version of the list H and the latest version of the list D from the CA device 30 via the internet 20 and the communication unit 203 (S108), writes the corresponding latest version over the list H stored in the latest list storage unit 206 (S109), and writes the corresponding latest version over the list D stored in the latest list storage unit 209 (S110).

Next, the certificate sending unit 208 reads the public key certificate of the personal computer 200 from the certificate storage unit 207. The certificate sending unit 208 also extracts, from the list H in the latest list storage unit 206, a partial list that contains a version number, a pair of identifiers corresponding to a section including the identifier of the public key certificate of the personal computer 200, and CA signature data for the version number and the pair of identifiers (S111). The certificate sending unit 208 outputs the read public key certificate and the extracted partial list to the drive device 100 via the I/O unit 201 (S112).

In the drive device 100, the verification unit 104 receives the partial list and the public key certificate from the personal computer 200 via the I/O unit 102 (S112). The verification unit 104 reads the CA's public key PK_CA from the public key storage unit 103, verifies CA signature data included in the received partial list using the CA's public key PK_CA, and also verifies CA signature data included in the received public key certificate using the CA's public key PK_CA (S113). If any of these two signature verifications has failed (S114), the operation is terminated. If both of the signature verifications have succeeded (S114), the verification unit 104 further judges whether the partial list shows an identifier included in the received public key certificate (S115). If the partial list does not show the identifier, the verification unit 104 judges the public key certificate as being invalid (S116), and terminates the operation. If the partial list shows the identifier, the verification unit 104 judges the public key certificate as being valid (S116). After this, the certificate sending unit 106 reads the public key certificate of the drive device 100 from the certificate storage unit 105 (S117), and outputs the read public key certificate to the personal computer 200 via the I/O unit 102 (S118).

In the personal computer 200, the verification unit 210 receives the public key certificate of the drive device 100 from the drive device 100 via the I/O unit 201 (S118). The verification unit 210 reads the CA's public key PK_CA from the public key storage unit 211, and verifies CA signature data included in the received public key certificate using the CA's public key PK_CA (S119). If the signature verification has failed (S120), the operation is terminated. If the signature verification has succeeded (S120), the verification unit 210 judges whether the public key certificate is invalid, based on the list D in the latest list storage unit 209 (S121). If the public key certificate is judged as being invalid (S122), the operation is terminated. If the public key certificate is judged as being valid (S122), the public key encryption unit 212 in the personal computer 200 and the public key encryption unit 107 in the drive device 100 execute authentication and key sharing for establishing a SAC which enables secure transfer of information to be performed on the general-purpose communications channel 40 between the personal computer 200 and the drive device 100. In the key sharing, the public key encryption unit 212 and the public key encryption unit 107 generate the shared session key (S124, S123). Thus, the public key encryption unit 212 in the personal computer 200 and the public key encryption unit 107 in the drive device 100 function to establish the SAC which ensures secure transfer of data, as a result of which the session key is shared by the personal computer 200 and the drive device 100.

After this, in the personal computer 200 the decryption unit 213 requests the encrypted content key from the drive device 100 via the I/O unit 201 (S130).

In the drive device 100, the encryption unit 108 receives the request (S130). The encryption unit 108 reads the encrypted content key 303 from the storage medium 300 via the I/O unit 101 (S131), and applies an encryption algorithm to the encrypted content key 303 using the session key generated by the public key encryption unit 107 to obtain the double-encrypted content key (S132). The encryption unit 108 outputs the double-encrypted content key to the personal computer 200 via the I/O unit 102 (S133).

In the personal computer 200, the decryption unit 213 receives the double-encrypted content key from the drive device 100 via the I/O unit 201 (S133). The decryption unit 213 applies a decryption algorithm to the double-encrypted content key using the session key generated by the public key encryption unit 212 to obtain the encrypted content key, and outputs the encrypted content key to the decryption unit 214 (S134). Following this, the decryption unit 205 requests the encrypted media key from the drive device 100 via the I/O unit 201 (S135).

In the drive device 100, the I/O unit 102 receives the request (S135), reads the encrypted media key set 302 from the storage medium 300 via the I/O unit 101 (S136), and outputs the encrypted media key set 302 to the personal computer 200 (S137).

In the personal computer 200, the decryption unit 205 receives the encrypted media key set 302 from the storage medium 300 via the drive device 100 and the I/O unit 201 (S137), and extracts the encrypted media key corresponding to the personal computer 200 from the encrypted media key set 302. The decryption unit 205 reads the device key $DK_j$ from the device key storage unit 204, and applies a decryption algorithm to the encrypted media key using the device key $DK_j$. The decryption unit 205 outputs the decrypted media key to the decryption unit 214 (S138). The decryption unit 214 receives the encrypted content key from the decryption unit 213, and the decrypted media key from the decryption unit 205. The decryption unit 214 applies a decryption algorithm to the encrypted content key using the decrypted media key, and outputs the decrypted content key to the decryption unit 215 (S139). The decryption unit 215 requests the encrypted content from the drive device 100 via the I/O unit 201 (S140).

In the drive device 100, the I/O unit 102 receives the request (S140). The I/O unit 102 responsively reads the encrypted content 304 from the storage medium 300 via the I/O unit 101 (S141), and outputs the encrypted content 304 to the personal computer 200 (S142).

In the personal computer 200, the decryption unit 215 receives the encrypted content 304 from the storage medium 300 via the drive device 100 and the I/O unit 201 (S142). The decryption unit 215 also receives the decrypted content key from the decryption unit 214, and applies a decryption algorithm to the encrypted content 304 using the decrypted content key. The decryption unit 215 outputs the decrypted content to the playback unit 216 (S143). The playback unit 216 receives the decrypted content from the decryption unit 215, and applies algorithms for decoding, decompression, and the like to the decrypted content to generate digital video and audio data. The playback unit 216 then converts the digital video and audio data to analog video and audio signals, and outputs the analog video and audio signals respectively to the monitor 217 and the speaker 218. The monitor 217 generates video from the video signal and displays it. The speaker 218 generates audio from the audio signal and outputs it (S144).

(2) Operation of Establishing a SAC

Figure 10:
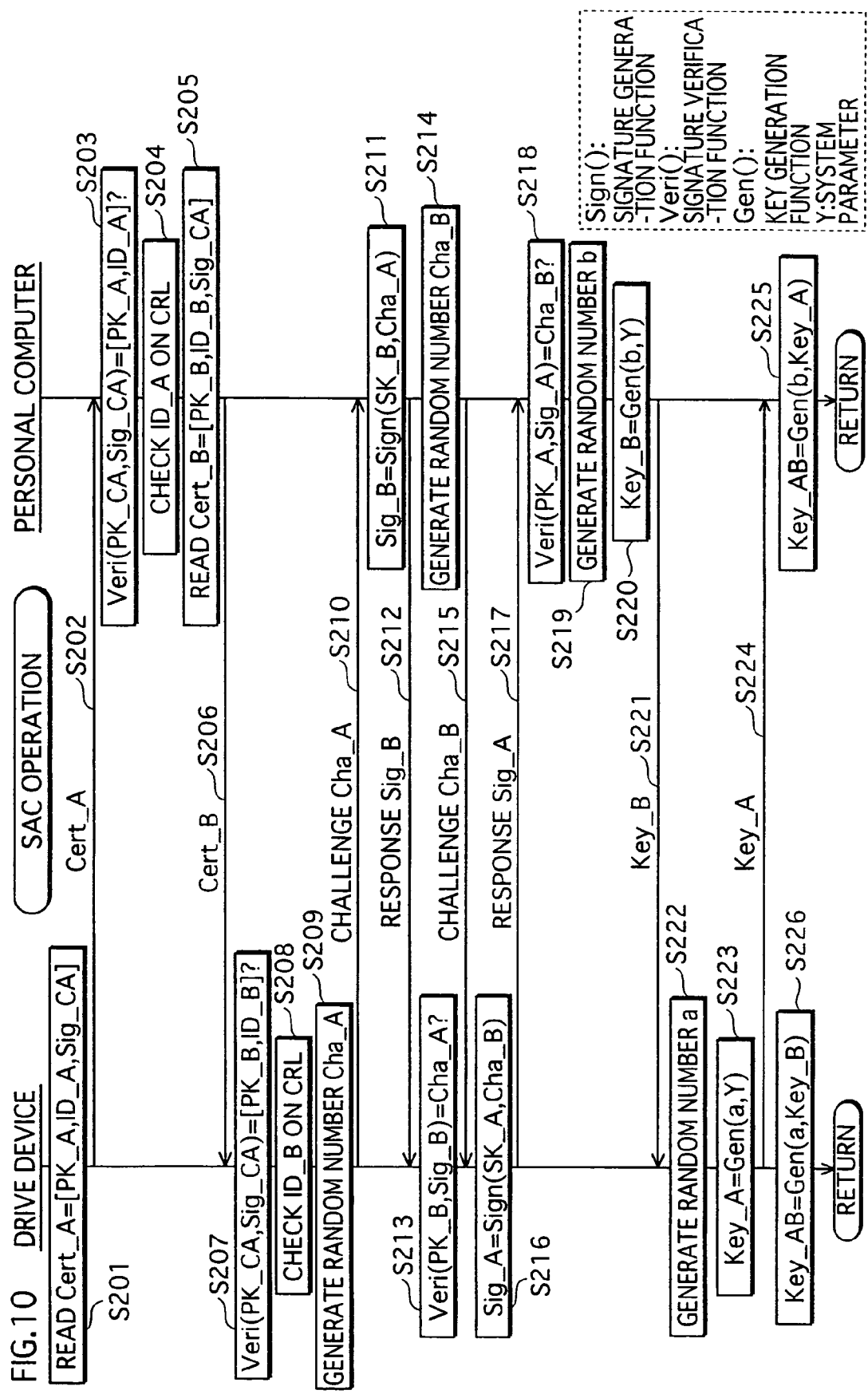
FIG. 10 is a flowchart showing an operation of establishing a SAC between the drive device 100 and the personal computer 200.

An operation of establishing a SAC between the drive device 100 and the personal computer 200 is described below, with reference to a flowchart shown in FIG. 10.

Here, let Sign( ) denote a signature generation function, Veri( ) a signature verification function, Gen( ) a key generation function, and Y a system parameter unique to the authentication system 10.

Also, the key generation function Gen( ) satisfies a relationship:

$$Gen(x,Gen(y,z))=Gen(y,Gen(x,z))$$

Such a key generation function can be realized using known techniques in the art, and so its detailed explanation has been omitted here. One example of such techniques is the Diffie-Hellman (DH) public key distribution scheme.

The public key encryption unit 107 reads a certificate Cert_A issued by the CA from the certificate storage unit 105 (S201), and outputs the certificate Cert_A to the public key encryption unit 212 (S202). Here, the certificate Cert_A includes a public key PK_A of the drive device 100, an identifier ID_A of the certificate Cert_A, and CA signature data Sig_CA for the public key PK_A and the identifier ID_A.

The public key encryption unit 212 verifies the CA signature data Sig_CA in the certificate Cert_A, using the CA's public key PK_CA (S203). If the signature verification has failed, the operation is terminated. The public key encryption unit 212 further checks whether the identifier ID_A is registered in a CRL (S204). If the identifier ID_A is registered in the CRL, the operation is terminated.

The public key encryption unit 212 reads a certificate Cert_B issued by the CA from the certificate storage unit 207 (S205), and outputs the certificate Cert_B to the public key encryption unit 107 (S206). Here, the certificate Cert_B includes a public key PK_B of the personal computer 200, an identifier ID_B of the certificate Cert_B, and CA signature data Sig_CA for the public key PK_B and the identifier ID_B.

The public key encryption unit 107 verifies the CA signature data Sig_CA in the certificate Cert_B using the CA's public key PK_CA (S207). If the signature verification has failed, the operation is terminated. The public key encryption unit 107 further checks whether the identifier ID_B is registered in a CRL (S208). If the identifier ID_B is registered in the CRL, the operation is terminated.

The public key encryption unit 107 generates a random number Cha_A (S209), and sends the random number Cha_A to the public key encryption unit 212 (S210).

The public key encryption unit 212 generates signature data Sig_B for the random number Cha_A using a secret key SK_B of the personal computer 200 (S211), and sends the signature data Sig_B to the public key encryption unit 107 (S212).

The public key encryption unit 107 verifies the signature data Sig_B using the public key PK_B of the personal computer 200 received in step S206 (S213). If the signature verification has failed, the operation is terminated.

The public key encryption unit 212 generates a random number Cha_B (S214), and sends the random number Cha_B to the public key encryption unit 107 (S215).

The public key encryption unit 107 generates signature data Sig_A for the random number Cha_B using a secret key SK_A of the drive device 100 (S216), and sends the signature data Sig_A to the public key encryption unit 212 (S217).

The public key encryption unit 212 verifies the signature data Sig_A using the public key PK_A of the drive device 100 received in step S202 (S218). If the signature verification has failed, the operation is terminated.

After this, the public key encryption unit 212 generates a random number b (S219), calculates Key_B=Gen(b,Y) (S220), and sends Key_B to the public key encryption unit 107 (S221).

The public key encryption unit 107 generates a random number a (S222), calculates Key_A=Gen(a,Y) (S223), and sends Key_A to the public key encryption unit 212 (S224). The public key encryption unit 107 also calculates shared key Key_AB=Gen(a,Key_B) (S226).

The public key encryption unit 212 calculates shared key Key_AB=Gen(b,Key_A) (S225).

In this way, the public key encryption unit 107 and the public key encryption unit 212 establish shared key Key-AB.

1.7. Conclusion

As described above, if the list H held in the personal computer 200 is old, the personal computer 200 is compelled to update the list H, because otherwise the drive device 100 will not authenticate the personal computer 200. This being so, by having the personal computer 200 update the list D together with the list H, updates of the list D which the personal computer 200 is originally not compelled to update can be ensured.

2. Second Embodiment

An authentication system 10b (not illustrated) which is a second embodiment of the present invention is described below.

2.1. Construction of the Authentication System 10b

The authentication system 10b is roughly made up of the drive device 100, a personal computer 200b, and a CA device 30b (not illustrated), like the authentication system 10. The storage medium 300 is inserted in the drive device 100.

In the authentication system 10, the list D which enumerates identifiers of revoked public key certificates and the list H which enumerates identifiers of unrevoked public key certificates are used to indicate the validity or invalidity of public key certificates. In the authentication system 10b, the list D and the list H are combined as a certificate identifier list which enumerates both the identifiers of the revoked public key certificates and the identifiers of the unrevoked public key certificates. This is the difference of the authentication system 10b from the authentication system 10.

The following mainly explains this difference from the authentication system 10.

The drive device 100 and the storage medium 300 in the authentication system 10b have the same constructions respectively as the drive device 100 and the storage medium 300 in the authentication system 10, and so their explanation has been omitted here.

It should be noted here that the version number MVN 301 stored on the storage medium 300 in the authentication system 10b specifies a generation of the certificate identifier list that is to be applied when using the data stored on the storage medium 300.

2.2. Construction of the Personal Computer 200b

The personal computer 200b has a similar construction to the personal computer 200. The personal computer 200b includes the I/O unit 201, a system LSI 230b, the communication unit 203, the playback unit 216, and the control unit 221 as shown in FIG. 11, as well as other construction elements not shown in the drawing.

The personal computer 200b is actually realized by a computer system that includes the system LSI, a microprocessor, a ROM, a RAM, a bus, a hard disk unit, a communication unit, and the like. A computer program is stored on the RAM or the hard disk unit. Part of the functions of the personal computer 200b is achieved by the microprocessor operating in accordance with this computer program.

The I/O unit 201, the communication unit 203, the playback unit 216, the control unit 221, and the other unillustrated construction elements in the personal computer 200b are respectively the same as the I/O unit 201, the communication unit 203, the playback unit 216, the control unit 221, and the other unillustrated construction elements in the personal computer 200.

Figure 11:
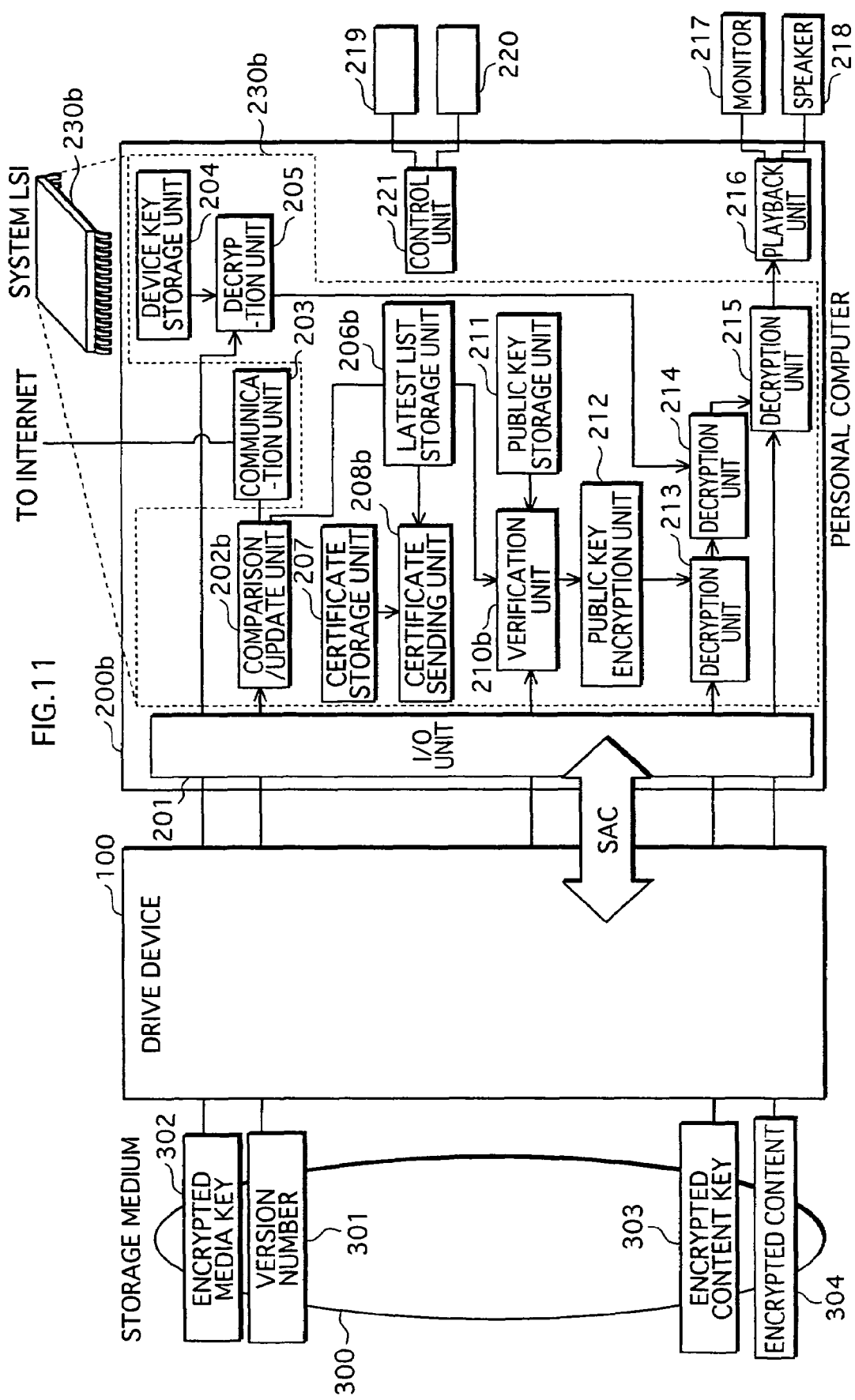
FIG. 11 is a block diagram showing a construction of a personal computer 200b in an authentication system 10b.

The system LSI 230b includes a comparison/update unit 202b, the device key storage unit 204, the decryption unit 205, a latest list storage unit 206b, the certificate storage unit 207, a certificate sending unit 208b, a verification unit 210b, the public key storage unit 211, the public key encryption unit 212, the decryption unit 213, the decryption unit 214, and the decryption unit 215, as shown in FIG. 11.

The device key storage unit 204, the decryption unit 205, the certificate storage unit 207, the public key storage unit 211, the public key encryption unit 212, the decryption unit 213, the decryption unit 214, and the decryption unit 215 in the system LSI 230b are respectively the same as the device key storage unit 204, the decryption unit 205, the certificate storage unit 207, the public key storage unit 211, the public key encryption unit 212, the decryption unit 213, the decryption unit 214, and the decryption unit 215 in the system LSI 230.

The following explains the comparison/update unit 202b, the latest list storage unit 206b, the certificate sending unit 208b, and the verification unit 210b.

(1) Latest List Storage Unit 206b

The latest list storage unit 206b stores a certificate identifier list 600 that shows the validity and invalidity of public key certificates, in advance.

A manufacturer of the personal computer 200b acquires the certificate identifier list 600 from the CA, and writes it to the latest list storage unit 206b at the time of manufacture.

Figure 12:
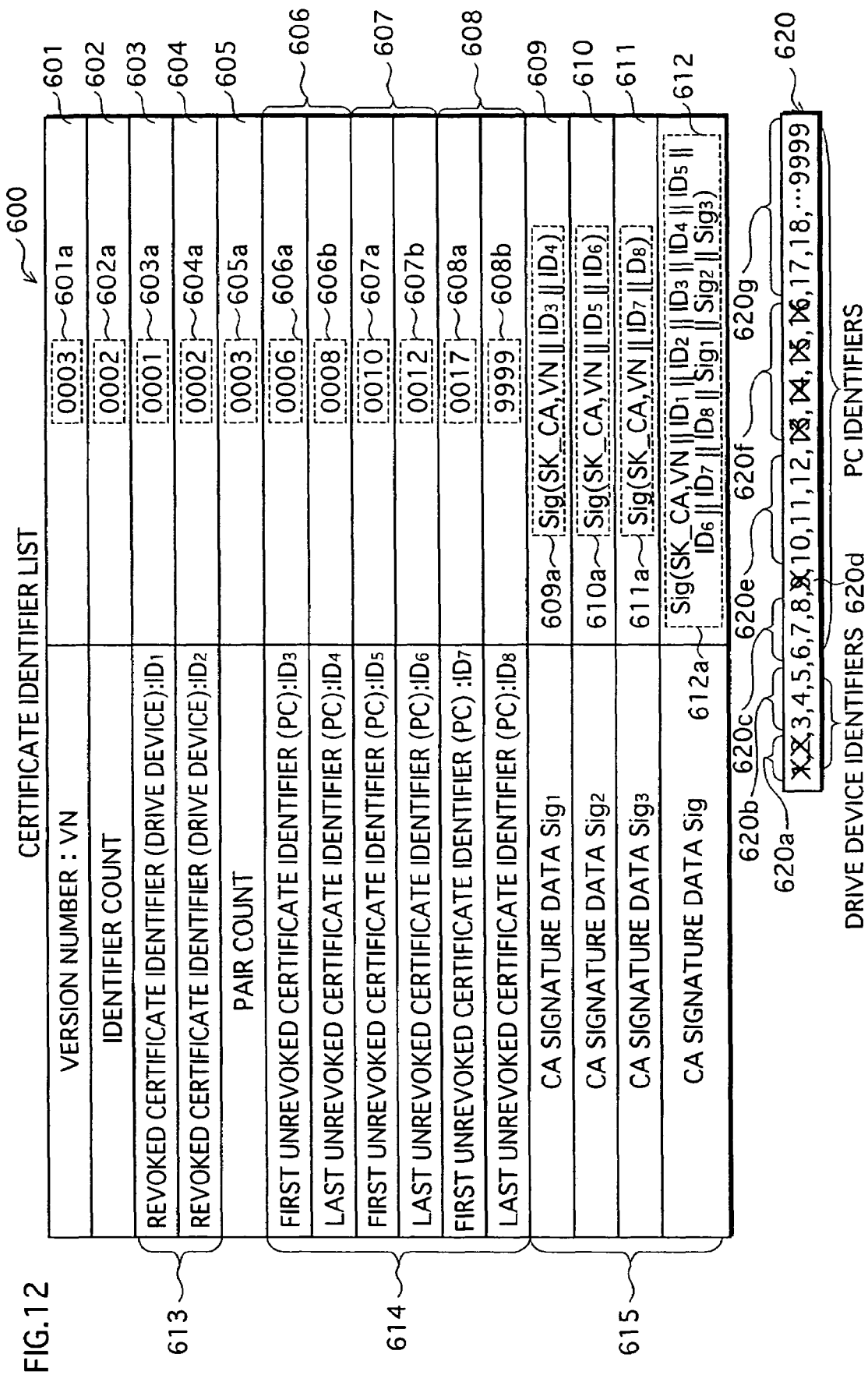
FIG. 12 shows an example data structure of a certificate identifier list 600.

FIG. 12 shows one example of the certificate identifier list 600. According to this certificate identifier list 600, of public key certificates of drive devices, two public key certificates with identifiers ID=1 and 2 are revoked while the other public key certificates are unrevoked. Also, of public key certificates of personal computers, five public key certificates with identifiers ID=9 and 13 to 16 are revoked while the other public key certificates are unrevoked.

Each identifier is shown in a box 620 in FIG. 12. In the box 620, a crossed number indicates an identifier of a revoked public key certificate, whereas an uncrossed number indicates an identifier of an unrevoked public key certificate. In the box 620, a first section 620a of crossed numbers is made up of an identifier set {1, 2}. Following this, a section 620b of uncrossed numbers is made up of an identifier set {3, 4, 5}. Following this, a section 620c of uncrossed numbers is made up of an identifier set {6, 7, 8}. Following this, a section 620d of crossed numbers is made up of an identifier set {9}. Following this, a section 620e of uncrossed numbers is made up of an identifier set {10, 11, 12}. Following this, a section 620f of crossed numbers is made up of an identifier set {13, 14, 15, 16}. Following this, a section 620g of uncrossed numbers is made up of an identifier set {17, 18, . . . , 9999}.

As shown in FIG. 12, the certificate identifier list 600 has a version number field 601, an identifier count field 602, a revoked certificate identifier field 613, a pair count field 605, an unrevoked certificate identifier field 614, and a signature field 615.

The version number field 601 contains a version number VN 601a. The identifier count filed 602 contains an identifier count 602a. The revoked certificate identifier field 613 contains two revoked certificate identifiers $ID_1$ 603a and $ID_2$ 604a. The pair count field 605 contains a pair count 605a. The unrevoked certificate identifier field 614 contains six identifiers $ID_3$ 606a, $ID_4$ 606b, $ID_5$ 607a, $ID_6$ 607b, $ID_7$ 608a, and $ID_8$ 608b. The signature field 615 contains four sets of CA signature data 609a, 610a, 611a, and 612a.

The version number VN 601a specifies a generation of the certificate identifier list 600. The version number VN 601a is "0003" in the example of FIG. 12.

The identifier count 602a shows a number of revoked certificate identifiers in the revoked certificate identifier field 613. The identifier count 602a is "0002" in the example of FIG. 12.

The revoked certificate identifiers $ID_1$ 603a and $ID_2$ 604a are identifiers of revoked public key certificates. The revoked certificate identifiers $ID_1$ 603a and $ID_2$ 604a are respectively "0001" and "0002", in the example of FIG. 12.

The pair count 605a shows a number of sections which are each a group of consecutive identifiers of unrevoked public key certificates. The pair count 605a is "0003" in the example of FIG. 12, indicating that there are three such sections.

The two identifiers 606a and 606b constitute a pair 606, the two identifiers 607a and 607b constitute a pair 607, and the two identifiers 608a and 608b constitute a pair 608. Each of these pairs is constituted by first and last identifiers of a section in which identifiers of unrevoked public key certificates are consecutive.

In the example of FIG. 12, the pair 606 defines the section 620c which begins with the identifier "0006" and ends with the identifier "0008". The pair 607 defines the section 620e which begins with the identifier "0010" and ends with the identifier "0012". The pair 608 defines the section 620g which begins with the identifier "0017" and ends with the identifier "9999".

The CA signature data 609a corresponds to the pair 606, the CA signature data 610a corresponds to the pair 607, and the CA signature data 611a corresponds to the pair 608. The CA signature data 612a corresponds to the entire certificate identifier list 600.

The four sets of CA signature data 609a to 612a are each created by the CA. The three sets of CA signature data 609a to 611a are each included in the certificate identifier list 600 to prove the validity of the data of the corresponding pair. The CA signature data 612a is included in the certificate identifier list 600 to prove the validity of the data other than the CA signature data 612a itself.

The CA signature data 609a is generated by applying the digital signature algorithm Sig to concatenation data obtained by concatenating the version number VN 601a and the identifiers $ID_3$ 606a and $ID_4$ 606b in the pair 606 in this order, using the CA's secret key SK_CA:

(CA signature data $Sig_1$)=Sig(SK_CA,VN∥$ID_3$∥$ID_4$)

The CA signature data 610a is generated by applying the digital signature algorithm Sig to concatenation data obtained by concatenating the version number VN 601a and the identifiers $ID_5$ 607a and $ID_6$ 607b in the pair 607 in this order, using the CA's secret key SK_CA:

(CA signature data $Sig_2$)=Sig(SK_CA,VN∥$ID_5$∥$ID_6$)

The CA signature data 611a is generated by applying the digital signature algorithm Sig to concatenation data obtained by concatenating the version number VN 601a and the identifiers $ID_7$ 608a and $ID_8$ 608b in the pair 608 in this order, using the CA's secret key SK_CA:

(CA signature data $Sig_3$)=Sig(SK_CA,VN∥$ID_7$∥$ID_8$)

The CA signature data 612a is generated by applying the digital signature algorithm Sig to concatenation data obtained by concatenating the version number VN 601a, the identifiers $ID_1$ 603a, $ID_2$ 604a, $ID_3$ 606a, $ID_4$ 606b, $ID_5$ 607a, $ID_6$ 607b, $ID_7$ 608a, and $ID_8$ 608b, and the three sets of CA signature data 609a, 610a, and 611a in this order, using the CA's secret key SK_CA:

(CA signature data Sig)=Sig(SK_CA,
VN$\|ID_1\|ID_2\|ID_3\|ID_4\|ID_5\|ID_6\|ID_7\|ID_8\|Sig_1Sig_2\|Sig_3$)

In the above example, the CA signature data is generated from the concatenation data of the plurality of sets of data, but this is not a limit for the present invention. For example, the CA signature data may be generated from a hash value of the concatenation data. Also, the CA signature data is not limited to an appendix-type signature, and may instead be a recovery-type signature with which the data subjected to be signed is obtained after the signature verification. In this case, the certificate identifier list does not have the revoked certificate identifier field and the unrevoked certificate identifier field. Instead, each identifier is obtained from the CA signature data when the signature verification is performed.

(2) Comparison/update Unit 202b

The comparison/update unit 202b receives the version number MVN 301 from the storage medium 300 via the drive device 100 and the I/O unit 201. The comparison/update unit 202b also reads the version number VN of the certificate identifier list 600 from the latest list storage unit 206b, and compares the version number MVN and the version number VN to judge which version number is newer. In detail, the comparison/update unit 202b checks which of the version number MVN and the version number VN is larger, and judges the larger version number as being the newer version number. If the version number VN is older than the version number MVN, the comparison/update unit 202b judges that the certificate identifier list 600 stored in the latest list storage unit 206b is old. The comparison/update unit 202b accordingly connects to the CA device 30b via the communication unit 203 and the internet 20, acquires a latest version of the certificate identifier list 600 from the CA device 30b via the internet 20 and the communication unit 203, and writes the latest version over the certificate identifier list 600 stored in the latest list storage unit 206b.

(3) Certificate Sending Unit 208b

The certificate sending unit 208b reads a public key certificate of the personal computer 200b from the certificate storage unit 207. The certificate sending unit 208b also extracts, from the certificate identifier list 600 in the latest list storage unit 206b, a partial list that includes a version number, a pair of identifiers corresponding to a section including an identifier of the public key certificate of the personal computer 200, and CA signature data for the version number and the pair of identifiers. The certificate sending unit 208b sends the read public key certificate and the extracted partial list to the drive device 100 via the I/O unit 201.

Suppose the identifier of the public key certificate of the personal computer 200b is "0007". In this case, the certificate sending unit 208b extracts the version number VN 601a, the identifiers $ID_3$ 606a and $ID_4$ 606b corresponding to the section including the identifier "0007", and the CA signature data 609a, as the partial list.

The certificate sending unit 208b sends the public key certificate and such an extracted partial list to the drive device 100 via the I/O unit 201.

(4) Verification Unit 210b

The verification unit 210b receives the public key certificate of the drive device 100 from the drive device 100 via the I/O unit 201. The verification unit 210b reads the CA's public key PK_CA from the public key storage unit 211, and verifies CA signature data included in the received public key certificate using the CA's public key PK_CA. If the signature verification has failed, subsequent processing is terminated. If the signature verification has succeeded, the verification unit 210b further judges whether the received public key certificate is valid, based on the certificate identifier list 600 in the latest list storage unit 206b. In more detail, the verification unit 210b extracts an identifier from the public key certificate, and judges whether the certificate identifier list 600 shows the identifier. If the certificate identifier list 600 shows the identifier, the verification unit 210b judges the public key certificate as being invalid, and terminates subsequent processing. If the certificate identifier list 600 does not show the identifier, the verification unit 210b judges the public key certificate as being valid, and outputs the judgment result to the public key encryption unit 212.

2.3. Operation of the Authentication System 10b

The operation of the authentication system 10b is similar to the main operation of the authentication system 10 shown in FIGS. 6 to 9. The following explains the difference from the main operation of the authentication system 10.

In step S104, the comparison/update unit 202b compares the version number MVN 301 read from the storage medium 300, with the version number VN of the certificate identifier list 600 read from the latest list storage unit 206b.

If the version number VN is older than the version number MVN in step S105, the comparison/update unit 202b acquires a latest version of the certificate identifier list 600 from the CA device 30b via the internet 20 and the communication unit 203 in step S108, and writes the latest version over the certificate identifier list 600 stored in the latest list storage unit 206b in steps S109 and S110.

In step S111, the certificate sending unit 208b extracts, from the certificate identifier list 600 in the latest list storage unit 206b, a partial list made up of a version number, a pair of identifiers corresponding to a section including the identifier of the public key certificate of the personal computer 200b, and CA signature data for the version number and the pair of identifiers. The certificate sending unit 208b sends the public key certificate read from the certificate storage unit 207 and the extracted partial list to the drive device 100 via the I/O unit 201.

In step S121, the verification unit 210b judges whether the received public key certificate is valid, based on the certificate identifier list 600 in the latest list storage unit 206b.

3. Other Modifications

Although the present invention has been described by way of the above embodiments, the present invention is not limited to such. Example modifications are given below.

(1) The first embodiment describes the use of the list D 400 which enumerates the identifiers of the revoked public key certificates and the list H 500 which enumerates the identifiers of the unrevoked public key certificates. Meanwhile, the second embodiment describes the use of the certificate identifier list 600 which enumerates both the identifiers of the revoked public key certificates and the identifiers of the unrevoked public key certificates. However, the present invention is not limited to such.

FIG. 13 shows a certificate identifier list 700 which has a different data structure from any of the list D 400, the list H 500, and the certificate identifier list 600. In the drawing, the certificate identifier list 700 has aversion number field 730, a revoked or unrevoked certificate identifier field 731, a revoked or unrevoked certificate identifier field 732, a revoked or unrevoked certificate identifier section field 733, and a signature field 734.

Each identifier is shown in a box 721 in FIG. 13. In the box 721, a crossed number indicates an identifier of a revoked public key certificate, and an uncrossed number indicates an identifier of an unrevoked public key certificate.

In the box 721, the identifiers are divided into three groups 722, 723, and 724. The group 722 is made up of an identifier set {1, 2, ..., 8}. The group 723 is made up of an identifier set {9, 10, ..., 16}. The group 724 is made up of an identifier set {17, 18, ..., 9999}.

In the group 722, identifiers 725 and 726 are revoked certificate identifiers. In the group 723, identifiers 727 and 728 are unrevoked certificate identifiers. In the group 724, identifiers which constitute an identifier set 729 {18, ..., 9999} are unrevoked certificate identifiers.

The fields 731, 732, and 733 correspond to the groups 722, 723, and 724, respectively.

The version number field 730 contains a version number VN 701 which specifies a generation of the certificate identifier list 700, as in the list D 400, the list H 500, and the certificate identifier list 600.

The field 731 contains a type flag 741, group information 702, an identifier count 703, and identifiers $ID_1$ 704 and $ID_2$ 705.

The type flag 741 is expressed by a two-digit number, and takes one of the values "00", "01", "10", and "11". The value "00" indicates that the field 731 shows revoked certificate identifiers individually. The value "1" indicates that the field 731 shows revoked certificate identifiers as a section. The value "10" indicates that the field 731 shows unrevoked certificate identifiers individually. The value "11" indicates that the field 731 shows unrevoked certificate identifiers as a section.

In the example of FIG. 13, the type flag 741 is "00", indicating that the field 731 shows revoked certificate identifiers individually.

The group information 702 specifies the group 722 corresponding to the field 731. The group information 702 is made up of first and last identifiers of the group 722. In the example of FIG. 13, the group information 702 is "0001:0008", indicating the group 722 which begins with the identifier "0001" and ends with the identifier "0008".

The identifier count 703 shows a number of revoked certificate identifiers in the group 722. In the example of FIG. 13, the identifier count 703 is "0002", indicating that there are two revoked certificate identifiers in the group 722.

The identifiers $ID_1$ 704 and $ID_2$ 705 show the revoked certificate identifiers.

The field 732 contains a type flag 742, group information 706, an identifier count 707, and identifiers $ID_3$ 708 and $ID_4$ 709.

The type flag 742 is the same as the type flag 741. In the example of FIG. 13, the type flag 742 is "10", indicating that the field 732 shows unrevoked certificate identifiers individually.

The group information 706 shows the group 723 corresponding to the field 732. The group information 706 is made up of first and last identifiers of the group 723. In the example of FIG. 13, the group information 706 is "0009:0016", indicating the group 723 which begins with the identifier "0009" and ends with the identifier "0016".

The identifier count 707 shows a number of unrevoked certificate identifiers in the group 723. In the example of FIG. 13, the identifier count 707 is "0002", indicating that there are two unrevoked certificate identifiers in the group 723.

The identifiers $ID_3$ 708 and $ID_4$ 709 show the unrevoked certificate identifiers.

The field 733 contains a type flag 743, group information 710, a pair count 711, and identifiers $ID_5$ 712a and $ID_6$ 712b.

The type flag 743 is the same as the type flag 741. In the example of FIG. 13, the type flag 743 is "11", indicating that the field 733 shows unrevoked certificate identifiers as a section.

The group information 710 shows the group 724 corresponding to the field 733. The group information 710 is made up of first and last identifiers of the group 724. In the example of FIG. 13, the group information 710 is "0017:9999", indicating the group 724 which begins with the identifier "0017" and ends with the identifier "9999".

The pair count 711 shows a number of unrevoked certificate identifier sections in the group 724. In the example of FIG. 13, the pair count 711 is "0001", indicating that there is one unrevoked certificate identifier section in the group 724.

The identifiers $ID_5$ 712a and $ID_6$ 712b show first and last identifiers of the section. In the example of FIG. 13, the identifiers $ID_5$ 712a and $ID_6$ 712b are respectively "0018" and "9999", indicating that the section begins with the identifier "0018" and ends with the identifier "9999".

The signature field 734 contains three sets of CA signature data 713, 714, and 715, which correspond to the fields 731, 732, and 733 respectively.

The CA signature data 713 is generated by applying the digital signature algorithm Sig to concatenation data obtained by concatenating the type flag 741, the two identifiers in the group information 702, the version number VN 701, and the identifiers $ID_1$ 704 and $ID_2$ 705 in this order, using the CA's secret key SK_CA:

(CA signature data $Sig_1$)=Sig(SK_CA,
Flag‖0001‖0008‖VN‖$ID_1$‖$ID_2$)

The CA signature data 714 is generated by applying the digital signature algorithm Sig to concatenation data obtained by concatenating the type flag 742, the two identifiers in the group information 706, the version number VN 701, and the identifiers $ID_3$ 708 and $ID_4$ 709 in this order, using the CA's secret key SK_CA:

(CA signature data $Sig_2$)=Sig(SK_CA,
Flag‖009‖0016‖VN‖$ID_3$‖$ID_4$)

The CA signature data 715 is generated by applying the digital signature algorithm Sig to concatenation data obtained by concatenating the type flag 743, the two identifiers in the group information 710, the version number VN 701, and the identifiers $ID_5$ 712a and $ID_6$ 712b in this order, using the CA's secret key SK_CA:

(CA signature data $Sig_3$)=Sig(SK_CA,
Flag‖0017‖9999‖VN‖$ID_5$‖$ID_6$)

(2) The list D in the first embodiment may be modified as follows.

FIG. 14 shows a certificate identifier list 800 having a different structure from the list D. In the drawing, the certificate identifier list 800 has a version number field 841, a revoked certificate identifier field 842, and a signature field 843.

Each identifier is shown in a box 820 in FIG. 14. In the box 820, a crossed number indicates an identifier of a revoked public key certificate, and an uncrossed number indicates an identifier of an unrevoked public key certificate.

In the box 820, identifiers 821, 822, and 823, identifiers which belong to a section 824, and an identifier 825 are revoked certificate identifiers.

The version number field 841 contains a version number VN 801 that specifies a generation of the certificate identifier list 800.

The field 842 contains a type flag 803a and an identifier $ID_1$ 803b, a type flag 804a and an identifier $ID_2$ 804b, a type flag 805a and an identifier $ID_3$ 805b, a type flag 806a and an identifier $ID_4$ 806b, a type flag 807a and an identifier $ID_5$ 807b, and a type flag 808a and an identifier $ID_6$ 808b.

The type flag 803a and the identifier $ID_1$ 803b correspond to each other. The type flag 803a indicates whether the identifier $ID_1$ 803b shows an individual identifier or one of first and last identifiers of a section. When the type flag 803a is "0", the identifier $ID_1$ 803b shows an individual identifier. When the type flag 803a is "1", the identifier $ID_1$ 803b shows one of first and last identifiers of a section. In the example of FIG. 14, the type flag 803a is "0", indicating that the identifier $ID_1$ 803b shows an individual identifier.

The same applies to the other pairs of type flags and identifiers.

In the example of FIG. 14, the type flags 806a and 807a are "1", so that the identifiers $ID_4$ 806b and $ID_5$ 807b respectively show first and last identifiers of a section. Which is to say, the identifiers $ID_4$ 806b and $ID_5$ 807b are respectively "0013" and "0015", indicating that all identifiers in the section from "0013" to "0015" are revoked certificate identifiers.

Thus, the certificate identifier list 800 shows a type flag corresponding to an identifier, to indicate whether the identifier is an individual identifier not belonging to a section or one of first and last identifiers of a section.

(3) The first and second embodiments describe the case where the storage medium is a prerecorded medium, such as a DVD-Video, on which encrypted content is recorded in advance. However, the present invention is not limited to this.

For instance, the storage medium may be a recordable medium such as a DVD-RAM. In this case, after the authentication is performed in the same way as in the first and second embodiments, encrypted content is recorded onto the storage medium by the personal computer. The personal computer functions as a play back device in the first and second embodiments, but may also function as a recording device as in this modification.

Also, the storage medium may be a flexible disk, a hard disk, a CD-ROM, an MO, a DVD-ROM, a DVD-RAM, a BD (Blu-ray Disc), a portable semiconductor memory, and the like.

(4) The first and second embodiments describe the case where the storage medium stores a version number of a list, but this is not a limit for the present invention. For example, the storage medium may store a latest list in addition to its version number, so that the personal computer updates a list held therein using the latest list stored on the storage medium.

(5) The first and second embodiments may be modified such that the drive device includes a storage unit for storing a version number of a list. In this case, the drive device compares the version number stored in the storage unit with a version number read from the storage medium, and sends a newer version number to the personal computer.

Furthermore, the drive device may include a storage unit for storing the list in addition to its version number. In this case, the drive device compares the version number stored in the storage unit with the version number read from the storage medium, and sends the stored version number and list to the personal computer if the stored version number is newer than the read version number.

(6) The first and second embodiments describe the case where the data used for authentication and the content are stored on the storage medium, but this is not a limit for the present invention. For instance, the data used for authentication and the content may be transferred via a communication medium instead of the storage medium. Also, the storage medium and the communication medium may be used in combination.

(7) The first and second embodiments describe the case where the data used for authentication is protected using a signature by the CA, but the present invention is not limited to such. For example, each of the drive device and the personal computer may use its unique secret key to generate authentication code and add the authentication code to the data used for authentication.

(8) The first and second embodiments may be modified such that instead of the system LSI, a processor in the personal computer operates according to a computer program installed in the personal computer.

This computer program is a program for decrypting encrypted content and playing back the decrypted content. Alternatively, the computer program may be recording software for encrypting content and writing the encrypted content to a storage medium.

(9) The first and second embodiments describe the use of the personal computer and the drive device, but the same effects can equally be achieved by a DVD playback device including a drive unit. Such a DVD playback device is configured to include the personal computer and the drive device. Also, a DVD recording device may be used instead of the DVD playback device.

Furthermore, a digital television display device and a digital broadcast reception device, such as a set-top box, may respectively be used instead of the personal computer and the drive device.

In this case, the digital broadcast reception device receives a version number which is broadcast via digital broadcasting. The digital television display device acquires the version number from the digital broadcast reception device, and compares a version number stored therein with the acquired version number to judge whether the whitelist needs to be updated. If the whitelist is judged as needing to be updated, the digital television display device acquires a latest version of the whitelist and updates the whitelist stored therein to the latest version. The digital television display device also acquires a latest version of the blacklist and updates the blacklist stored therein to the latest version.

The digital television display device proves its validity using the whitelist, and judges whether the digital broadcast reception device is invalid using the blacklist. The digital broadcast reception device judges whether the digital television display device is valid using the whitelist.

If the digital television display device and the digital broadcast reception device have succeeded in authenticating each other, the digital broadcast reception device outputs encrypted content received via digital broadcasting to the digital television display device, which decrypts the encrypted content and displays the decrypted content.

The first and second embodiments may also be modified such that a portable information communications terminal is used instead of a mobile telephone.

(10) The first and second embodiments describe the case where a version number is expressed by a numeric value with a larger numeric value indicating a newer generation, but this is not a limit for the present invention. As one example, a larger numeric value may indicate an older generation.

The first and second embodiments describe the case where the judgment on which list is newer is made by comparing version numbers of two lists, but this is not a limit for the present invention. For example, the judgment may be made by comparing dates and times at which the two lists were created. Like the version numbers, these dates and times serve to specify the generations of the corresponding lists.

Also, when the personal computer requests provision of digital information from a server device via the internet, the server device may provide the digital information on the condition that the personal computer updates the whitelist. In this case, the server device requests the personal computer to update the whitelist, and the personal computer responsively acquires a latest version of the whitelist and updates the whitelist stored therein to the latest version. Once the personal computer has updated the whitelist, the server device provides the digital information to the personal computer.

(11) The present invention relates to an authentication system including a storage medium which stores accessory information of authentication data, a reading device which reads the accessory information from the storage device, and a terminal device which uses the storage medium.

The terminal device includes a storage unit for storing a plurality of sets of authentication data, a reception unit for receiving the accessory information, and a comparison unit for comparing the received accessory information with accessory information of authentication data stored in the storage unit. If the authentication data is judged as needing to be updated as a result of the comparison, the terminal device connects to an external device, acquires updated versions of the plurality of sets of authentication data, and updates the plurality of sets of authentication data in the storage unit to the updated versions.

Here, at least one of the plurality of sets of authentication data may be used for proving the validity of the terminal device itself to the reading device. Also, at least one of the plurality of sets of authentication data may be used for verifying whether the reading device is valid or not.

Here, the terminal device may further include a sending unit for sending partial authentication data extracted from the authentication data for proving the validity of the terminal device to the reading device, wherein the reading device includes a reception unit for receiving the partial authentication data.

Here, the reading device may further include a storage unit for storing the accessory information of the authentication data, a comparison unit for comparing the accessory information read from the storage medium with the accessory information stored in the storage unit, and a sending unit for sending data. If the stored accessory information is judged as being newer than the read accessory information, the reading device sends the stored accessory information to the terminal device.

Here, the reading device may further include a storage unit for storing the authentication data, a comparison unit for comparing the accessory information read from the storage medium with the accessory information of the authentication data stored in the storage unit, and a sending unit for sending data. If the accessory information of the authentication data stored in the storage unit is judged as being newer than the read accessory information, the reading device sends the stored authentication data to the terminal device.

Here, the storage medium may store the authentication data in addition to the accessory information.

Here, a communication medium may be used instead of the storage medium.

The present invention also relates to an authentication system including a storage medium which stores accessory information of authentication data, a reading device which reads the accessory information from the storage medium, and a terminal device which uses the storage medium.

The terminal device includes a storage unit for storing one set of authentication data, a reception unit for receiving the accessory information, and a comparison unit for comparing the received accessory information with accessory information of the authentication data stored in the storage unit. If the authentication data is judged as needing to be updated as a result of the comparison, the terminal device connects to an external device, acquires an updated version of the authentication data, and updates the authentication data stored in the storage unit to the updated version. This authentication data includes authentication data for proving the validity of the terminal device itself to the reading device, and authentication data for verifying whether the reading device is valid or not.

Here, the terminal device may further include a sending unit for sending partial authentication data extracted from the authentication data for proving the validity of the terminal device to the reading device, wherein the reading device includes a reception unit for receiving the partial authentication data.

Here, the reading device may further include a storage unit for storing the accessory information of the authentication data, a comparison unit for comparing the accessory information read from the storage medium with the accessory information stored in the storage unit, and a sending unit for sending data. If the stored accessory information is judged as being newer than the read accessory information as a result of the comparison, the reading unit sends the stored accessory information to the terminal device.

Here, the reading device may further include a storage unit for storing the authentication data, a comparison unit for comparing the accessory information read from the storage medium with the accessory information of the authentication data stored in the storage unit, and a sending unit for sending data. If the accessory information of the stored authentication data is judged as being newer than the read accessory information, the reading device sends the stored authentication data to the terminal device.

Here, the storage medium may store the authentication data in addition to the accessory information.

Here, a communication medium may be used instead of the storage medium.

The present invention also relates to a terminal device which uses a storage medium. The terminal device includes a storage unit for storing a plurality of sets of authentication data, a reception unit for receiving accessory information, and a comparison unit for comparing the received accessory information with accessory information of authentication data stored in the storage unit. If the authentication data is judged as needing to be updated as a result of the comparison, the terminal device connects to an external device, acquires updated versions of the plurality of sets of authentication data, and updates the plurality of sets of authentication data in the storage unit to the updated versions.

Here, at least one of the plurality of sets of authentication data may be used for proving the validity of the terminal device itself to the reading device. Also, at least one of the plurality of sets of authentication data may be used for verifying whether the reading device is valid or not.

Here, the terminal device may further include a sending unit for sending partial authentication data extracted from the authentication data for proving the validity of the terminal device, to the reading device.

The present invention also relates to a terminal device which uses a storage medium. The terminal device includes a storage unit for storing one set of authentication data, a reception unit for receiving accessory information, and a comparison unit for comparing the received accessory information with accessory information of the authentication data stored in the storage unit. If the authentication data is judged as needing to be updated as a result of the comparison, the terminal device connects to an external device, acquires an updated version of the authentication data from the external device, and updates the authentication data in the storage unit to the updated version. This authentication data includes authentication data for proving the validity of the terminal device itself to the reading device, and authentication data for verifying whether the reading device is valid or not.

Here, the terminal device may further include a sending unit for sending partial authentication data extracted from the authentication data for proving the validity of the terminal device, to the reading device.

The present invention also relates to a reading device which reads accessory information from a storage medium. The reading device includes a storage unit, a first reception unit, a comparison unit, a sending unit, a second reception unit, and a verification unit. The storage unit stores authentication data. The first reception unit receives the accessory information. The comparison unit compares the received accessory information with accessory information of the authentication data stored in the storage unit. If the authentication data stored in the storage unit is judged as needing to be updated as a result of the comparison, the reading device connects to an external device, acquires an updated version of the authentication data from the external device, and updates the authentication data in the storage unit to the updated version. The sending unit extracts partial authentication data for proving the validity of a terminal device from the authentication data, and sends the partial authentication data to the terminal device. The second reception unit receives the partial authentication data from the terminal device. The verification unit verifies the received partial authentication data.

Here, the reading device may further include a storage unit for storing the accessory information of the authentication data, a comparison unit for comparing the accessory information read from the storage medium with the accessory information stored in the storage unit, and a sending unit for sending data. If the stored accessory information is judged as being newer than the read accessory information as a result of the comparison, the reading device sends the stored accessory information to the terminal device.

Here, the reading device may further include a storage unit for storing the authentication data, a comparison unit for comparing the accessory information read from the storage medium with the accessory information of the authentication data stored in the storage unit, and a sending unit for sending data. If the accessory information of the stored authentication data is judged as being newer than the read accessory information as a result of the comparison, the reading device sends the stored authentication data to the terminal device.

The present invention also relates to a storage medium storing accessory information of authentication data. A terminal device includes a storage unit for storing the authentication data, a reception unit for receiving the accessory information, and a comparison unit for comparing the received accessory information with accessory information of the authentication data stored in the storage unit. If the authentication data stored in the storage unit is judged as needing to be updated as a result of the comparison, the terminal device connects to an external device, acquires an updated version of the authentication data from the external device, and updates the authentication data in the storage unit to the updated version. The terminal device further includes a sending unit for extracting partial authentication data for proving the validity of the terminal device itself from the authentication data, and sending the extracted partial authentication data to a reading device. The storage medium is used by this terminal device.

The present invention also relates to authentication data. This authentication data is an integrated combination of data used for judging the validity of a terminal device and data used for judging the validity of a reading device.

Here, the authentication data may include verification data corresponding to each predetermined part of the data used for judging the validity of the terminal device, so that the validity can be judged using only part of the data.

Here, the authentication data may include verification data corresponding to the entire data used for judging the validity of the reading device.

Here, the authentication data may include verification data corresponding to each predetermined part of the data used for judging the validity of the reading device, so that the validity can be judged using only part of the data.

Here, the authentication data may be accompanied by verification data corresponding to the entire authentication data.

The present invention also relates to authentication data. This authentication data is a combination of at least two out of data showing validity, data showing invalidity, data showing a valid section, and data showing an invalid section.

Here, the authentication data may include a flag indicating whether data shows a section.

Here, the authentication data may include verification data corresponding to each predetermined part of data used for judging the validity of a terminal device, so that the validity can be judged using only part of the data.

Here, the authentication data may include verification data corresponding to entire data used for judging the validity of a reading device.

Here, the authentication data may include verification data corresponding to each predetermined part of data used for judging the validity of the reading device, so that the validity can be judged using only part of the data.

Here, the authentication data may be accompanied by verification data corresponding to the entire authentication data.

According to the present invention, when a playback device updates a list showing whether the playback device itself is valid, the playback device also updates a list showing whether a reading device with which the playback device is communicating is invalid. This makes it possible to ensure that the playback device updates the list relating to the reading device. If the playback device does not update the list showing whether the playback device itself is valid, the playback device cannot be provided with content from the reading device. Therefore, the playback device is compelled to update the list relating to the playback device itself. This being so, by having the playback device update the list relating to the reading device together with the list relating to the playback device, updates of the list relating to the reading device can be ensured.

Also, according to the present invention, the list showing whether the playback device is valid and the list showing whether the reading device with which the playback device is communicating is invalid are combined as a single list and stored in the playback device. This means the former list and the latter list are updated at the same time. Hence updates of the list relating to the reading device can be ensured.

(12) The first and second embodiments and the above modifications describe the use of the list D, the list H, and the certificate identifier lists which each show identifiers of revoked public key certificates or identifiers of unrevoked public key certificates, but the present invention is not limited to such.

For example, a valid device list showing identifiers of valid devices and an invalid device list showing identifiers of invalid devices may be used instead of the above lists. Based on such valid device list and invalid device list, the personal computer and the drive device each prove its validity and judge the invalidity of the other device. In the same way as in the above embodiments, the personal computer judges whether the valid device list needs to be updated, based on a version number of the valid device list. If the valid device list is judged as needing to be updated, the personal computer acquires a latest version of the valid device list, and updates the valid device list stored therein to the latest version. The personal computer also acquires a latest version of the invalid device list, and updates the invalid device list stored therein to the latest version.

Alternatively, a valid device list showing identifiers of valid devices and an invalid medium list showing identifiers of invalid storage media may be used instead of the above lists. Based on such valid device list and invalid medium list, the personal computer and the drive device each judge the validity of a device and the invalidity of a storage medium. In detail, the personal computer judges whether the valid device list needs to be updated, based on a version number of the valid device list. If the valid device list is judged as needing to be updated, the personal computer acquires a latest version of the valid device list, and updates the valid device list stored therein to the latest version. When doing so, the personal computer also acquires a latest version of the invalid medium list, and updates the invalid medium list stored therein to the latest version.

Alternatively, a valid device list showing identifiers of valid devices, an invalid device list showing identifiers of invalid devices, and an invalid medium list showing identifiers of invalid storage media may be used instead of the above lists. Based on such valid device list, invalid device list, and invalid medium list, the personal computer and the drive device each judge the validity and invalidity of a device and the invalidity of a storage medium. In detail, the personal computer judges whether the valid device list needs to be updated, based on a version number of the valid device list. If the valid device list is judged as needing to be updated, the personal computer acquires a latest version of the valid device list, and updates the valid device list stored therein to the latest version. When doing so, the personal computer also acquires a latest version of the invalid device list and updates the invalid device list stored therein to the latest version, and acquires a latest version of the invalid medium list and updates the invalid medium list stored therein to the latest version.

Alternatively, a valid device list showing identifiers of valid devices, an invalid device list showing identifiers of invalid devices, and an invalid work list showing identifiers of invalid digital works may be used instead of the above lists. Based on such valid device list, invalid device list, and invalid work list, the personal computer and the drive device each judge the validity and invalidity of a device and the invalidity of a digital work. In detail, the personal computer judges whether the valid device list needs to be updated, based on a version number of the valid device list. If the valid device list is judged as needing to be updated, the personal computer acquires a latest version of the valid device list and updates the valid device list stored therein to the latest version. When doing so, the personal computer also acquires a latest version of the invalid device list and updates the invalid device list stored therein to the latest version, and acquires a latest version of the invalid work list and updates the invalid work list stored therein to the latest version.

(13) The authentication system according to the present invention has an effect of achieving efficient authentication by ensuring the playback device updates the list relating to the reading device, despite that the playback device is originally not compelled to update the list. This can be done by having the playback device update the list relating to the reading device when updating the list relating to the playback device itself, or by integrating the list relating to the reading device and the list relating to the playback device as a single list. Hence the present invention is useful in an authentication system that uses public key cryptography.

(14) The present invention also applies to a method described above. This method may be realized by a computer program that is executed by a computer. Such a computer program may be distributed as a digital signal.

The present invention may be realized by a computer-readable storage medium, such as a flexible disk, a hard disk, a CD-ROM, an MO, a DVD, a DVD-ROM, a DVD-RAM, a BD (Blu-ray Disc), or a semiconductor memory, on which the above computer program or digital signal is recorded. Conversely, the present invention may also be realized by the computer program or digital signal that is recorded on such a storage medium.

The computer program or digital signal that achieves the present invention may also be transmitted via a network, such as an electronic communications network, a wired or wireless communications network, or an internet, or via data broadcasting.

The present invention can also be realized by a computer system that includes a microprocessor and a memory. In this case, the computer program can be stored in the memory, with the microprocessor operating in accordance with this computer program.

The computer program or digital signal may be provided to an independent computer system by distributing a storage medium on which the computer program or digital signal is recorded, or by transmitting the computer program or digital signal via a network or the like. The independent computer system may then execute the computer program or digital signal to function as the present invention.

(15) The above embodiments and modifications may be freely combined.

Each of the devices, methods, computer programs, data, and storage media storing the computer programs and data to which the present invention relates can be used recurrently and continuously in any industry that involves authentication. Also, the devices and storage media to which the present invention relates can be manufactured and sold recurrently and continuously in an electrical product manufacturing industry.

The invention claimed is:

1. A judgment device that judges whether an object is invalid using a blacklist, the judgment device comprising:
   a holding unit operable to hold the blacklist indicating whether the object is invalid, and operable to hold a whitelist indicating whether the judgment device is valid;

a judgment unit operable to judge whether the whitelist needs to be updated;

an acquisition unit operable to, when the judgment unit judges that the whitelist needs to be updated, acquire together a latest blacklist and a latest whitelist, the acquisition unit acquiring the latest blacklist and the latest whitelist regardless of whether a judgment is made as to whether the blacklist needs to be updated; and an update unit operable to (i), when the judgment unit judges that the whitelist needs to be updated, write together the acquired latest blacklist and the acquired latest whitelist, respectively over the blacklist and the whitelist in the holding unit, and (ii), when the judgment unit judges that the whitelist does not need to be updated, perform no update of the blacklist and the whitelist held in the holding unit.

2. The judgment device of claim 1, wherein the object is a storage medium used for storing information, the holding unit holds a medium blacklist indicating whether the storage medium is invalid, the medium blacklist being held as the blacklist, the acquisition unit acquires a latest medium blacklist as the latest blacklist, and the update unit writes the latest medium blacklist over the medium blacklist held in the holding unit.

3. The judgment device of claim 1, wherein the object is a digital work, the holding unit holds a work blacklist indicating whether the digital work is invalid, the work blacklist being held as the blacklist, the acquisition unit acquires a latest work blacklist as the latest blacklist, and the update unit writes the latest work blacklist over the work blacklist held in the holding unit.

4. The judgment device of claim 1, wherein the object is an information acquisition device, the holding unit holds a device blacklist indicating whether the information acquisition device is invalid, the device blacklist being held as the blacklist, the acquisition unit acquires a latest device blacklist as the latest blacklist, and the update unit writes the latest device blacklist over the device blacklist held in the holding unit.

5. The judgment device of claim 4, wherein the information acquisition device is a medium access device for at least one of writing information to and reading information from a storage medium used for storing information.

6. The judgment device of claim 5, wherein the judgment device is integrated with the information acquisition device as a single device.

7. The judgment device of claim 4, wherein the information acquisition device is a digital broadcast reception device for receiving information that is broadcast by digital broadcasting.

8. The judgment device of claim 1, wherein the judgment unit performs the judgment of whether the whitelist needs to be updated using information about a generation of the whitelist.

9. The judgment device of claim 8, wherein the judgment unit includes:

a first acquisition subunit operable to acquire, from the object, first generation information indicating a required generation of the whitelist;

a second acquisition subunit operable to acquire second generation information indicating an actual generation of the whitelist held in the holding unit; and a judgment subunit operable to compare a generation indicated by the first generation information and a generation indicated by the second generation information, and operable to judge that the whitelist needs to be updated when the generation indicated by the first generation information is newer than the generation indicated by the second generation information.

10. The judgment device of claim 9, wherein the first acquisition subunit acquires a first version number indicating the required generation of the whitelist, the first version number being acquired as the first generation information, the second acquisition subunit acquires a second version number indicating the actual generation of the whitelist held in the holding unit, the second version number being acquired as the second generation information, and the judgment subunit compares the first version number and the second version number.

11. The judgment device of claim 1, wherein the blacklist includes an identifier of the object when the object is invalid, and the judgment device further comprises an invalidity judgment unit operable to judge whether the object is invalid, by checking whether the identifier of the object is included in the blacklist.

12. The judgment device of claim 1, wherein both the whitelist and the blacklist are integrated as a single list.

13. The judgment device of claim 1, wherein the whitelist includes one of an identifier of the judgment device and information indicating a set of identifiers of valid objects including the judgment device, when the judgment device is valid, and the blacklist includes one of an identifier of the object and information indicating a set of identifiers of invalid objects including the object, when the object is invalid.

14. An authentication system including a judgment device and an object, the judgment device judging whether the object is invalid using a blacklist, the judgment device comprising:

a holding unit operable to hold the blacklist indicating whether the object is invalid, and operable to hold a whitelist indicating whether the judgment device is valid;

a judgment unit operable to judge whether the whitelist needs to be updated;

an acquisition unit operable to, when the judgment unit judges that the whitelist needs to be updated, acquire together a latest blacklist and a latest whitelist, the acquisition unit acquiring the latest blacklist and the latest whitelist regardless of whether a judgment is made as to whether the blacklist needs to be updated; and an update unit operable to (i), when the judgment unit judges that the whitelist needs to be updated, write together the acquired latest blacklist and the acquired latest whitelist, respectively over the blacklist and the whitelist in the holding unit, and (ii), when the judgment unit judges that the whitelist does not need to be updated, perform no update of the blacklist and the whitelist held in the holding unit.

15. A judgment method used in a judgment device that judges whether an object is invalid using a blacklist, the judgment device including a holding unit operable to hold the blacklist indicating whether the object is invalid, and a whitelist indicating whether the judgment device is valid, the judgment method comprising:

judging whether the whitelist needs to be updated;

when the judging judges that the whitelist needs to be updated, acquiring together a latest blacklist and a latest whitelist, the acquiring being performed regardless of whether a judgment is made as to whether the blacklist needs to be updated;

when the judging judges that the whitelist needs to be updated, writing together the acquired latest blacklist and the acquired latest whitelist, respectively over the blacklist and the whitelist in the holding unit; and when the judging judges that the whitelist does not need to be updated, not performing an update of the blacklist and the whitelist held in the holding unit.

16. A computer-readable storage medium having a program stored thereon, the program for using a judgment device that judges whether an object is invalid using a blacklist, the judgment device including a holding unit operable to hold the blacklist indicating whether the object is invalid, and a whitelist indicating whether the judgment device is valid, and the program causing a computer to execute a method comprising:

judging whether the whitelist needs to be updated;

when the judging judges that the whitelist needs to be updated, acquiring together a latest blacklist and a latest whitelist, the acquiring being performed regardless of whether a judgment is made as to whether the blacklist needs to be updated;

when the judging judges that the whitelist needs to be updated, writing together the acquired latest blacklist and the acquired latest whitelist, respectively over the blacklist and the whitelist in the holding unit; and when the judging judges that the whitelist does not need to be updated, not performing an update of the blacklist and the whitelist held in the holding unit.

\* \* \* \* \*